US012658979B2

(12) United States Patent
Zhang et al.

(10) Patent No.: US 12,658,979 B2
(45) Date of Patent: Jun. 16, 2026

(54) METHODS FOR MEASURING AND REPORTING DOPPLER SHIFT

(71) Applicant: QUALCOMM Incorporated, San Diego, CA (US)

(72) Inventors: Yu Zhang, San Diego, CA (US); Muhammad Sayed Khairy Abdelghaffar, San Jose, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 18/006,349

(22) PCT Filed: Aug. 13, 2020

(86) PCT No.: PCT/CN2020/108880
§ 371 (c)(1),
(2) Date: Jan. 20, 2023

(87) PCT Pub. No.: WO2022/032567
PCT Pub. Date: Feb. 17, 2022

(65) Prior Publication Data
US 2023/0291440 A1 Sep. 14, 2023

(51) Int. Cl.
*H04B 7/01* (2006.01)
*H04L 5/00* (2006.01)
*H04W 24/10* (2009.01)

(52) U.S. Cl.
CPC ............. *H04B 7/01* (2013.01); *H04L 5/0051* (2013.01); *H04W 24/10* (2013.01)

(58) Field of Classification Search
CPC ......... H04B 7/01; H04L 5/0051; H04W 24/10
See application file for complete search history.

(56) References Cited

U.S. PATENT DOCUMENTS

2019/0059054 A1* 2/2019 Lee .......................... H04L 5/005
2023/0064231 A1* 3/2023 Haghighat ............ H04L 5/0053

FOREIGN PATENT DOCUMENTS

CN 106465163 A 2/2017
CN 107231825 A 10/2017
(Continued)

OTHER PUBLICATIONS

Ericsson: "CSI Feedback Enhancements for IIoT/URLLC," 3GPP TSG-RAN WG1 Meeting #102-e, R1-2005514, Aug. 17-28, 2020, Aug. 8, 2020 (Aug. 8, 2020), sections 2.1, 2.3, 7 pages.
(Continued)

*Primary Examiner* — Sulaiman Nooristany
(74) *Attorney, Agent, or Firm* — Holland & Hart LLP

(57) ABSTRACT
Methods, systems, and devices for wireless communications are described. A user equipment (UE) may identify an uplink resource for reporting a Doppler measurement to a base station. The UE may determine a reference signal set precedes a reference point associated with the uplink resource prior to performing Doppler measurements based on the reference signals in the reference signal set. Each reference signal in the reference signal set may occur no later than a channel state information (CSI) reference resource, or an offset relative to the uplink resource defined by a number of symbols. The UE may determine the Doppler measurement based on the reference signal set, or multiple reference signal sets and may transmit the Doppler measurement to the base station in the uplink resource.

20 Claims, 16 Drawing Sheets

(56)         References Cited

FOREIGN PATENT DOCUMENTS

| CN | 107819554 A | 3/2018 |
| CN | 110048971 A | 7/2019 |
| WO | WO-2019047945 A1 | 3/2019 |
| WO | WO-2019098930 A1 | 5/2019 |
| WO | WO-2021248431 A1 | 12/2021 |

OTHER PUBLICATIONS

Fraunhofer IIS., et al., "Mobility Enhancements for Mimo," 3GPP TSG RAN Meeting #85, RP-191951, Sep. 16-19, 2019, (Sep. 19, 2019), section 1, 6 pages.

International Search Report and Written Opinion—PCT/CN2020/108880—ISA/EPO—May 12, 2021.

Mediatek Inc: "On TRS Design", 3GPP Draft, 3GPP TSG-RAN WG1 Meeting #90, R1-1713713, On TRS Design_Final, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051316512, pp. 1,10-12, 14 pages.

OPPO: "Left Issues on CSI Report for NR-V2X", 3GPP Draft, R2-1914462, 3GPP TSG-RAN WG2 Meeting #108, 3rd Generation Partnership Project (3GPP), Mobile Competence Centre, 650, Route Des Lucioles, F-06921 Sophia-Antipolis Cedex, France, vol. RAN WG2, No. Reno, US, Nov. 18, 2019-Nov. 22, 2019, Nov. 8, 2019 (Nov. 8, 2019), pp. 1-3, XP051816542, Section 2.2.

Samsung: "Enhancements on HST-SFN," 3GPP TSG RAN WG1 #102-e, e-Meeting, Aug. 17-28, 2020, Aug. 7, 2020 (Aug. 7, 2020), R1-2006132, 5 pages, the whole document.

Fraunhofer IIS., et al., "NR Mobility Enhancements for FR1 and FR2", 3GPP TSG RAN Meeting #84, RP-191340, 3rd Generation Partnership Project (3GPP), Mobile Competence Centre, 650, Route Des Lucioles, F-06921, Sophia-Antipolis Cedex, France, vol. TSG RAN May 27, 2019, pp. 1-6, XP051739668, The Whole Document.

Qualcomm Incorporated: "Enhancements on HST-SFN Deployment", 3GPP TSG-RAN WG1 Meeting #102-e, R1-2006794, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020, XP051918244, 15 Pages, Sections 4.1 and 4.3, Figures 4-3, p. 5-11.

Supplementary European Search Report—EP20949066—Search Authority—The Hague—Apr. 22, 2024.

* cited by examiner

510

515

520

505

500

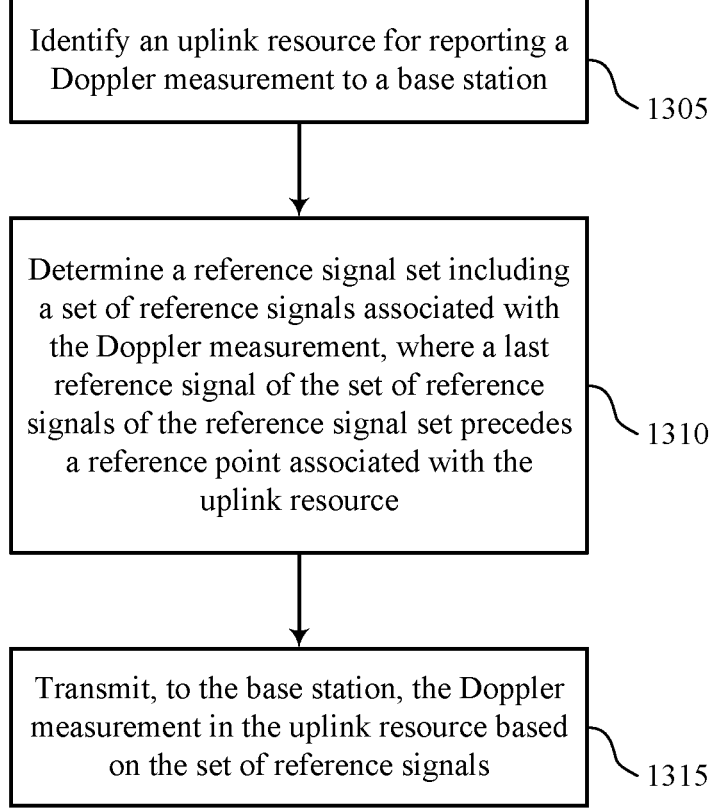

Identify an uplink resource for reporting a Doppler measurement to a base station

1305

Determine a reference signal set including a set of reference signals associated with the Doppler measurement, where a last reference signal of the set of reference signals of the reference signal set precedes a reference point associated with the uplink resource

1310

Transmit, to the base station, the Doppler measurement in the uplink resource based on the set of reference signals

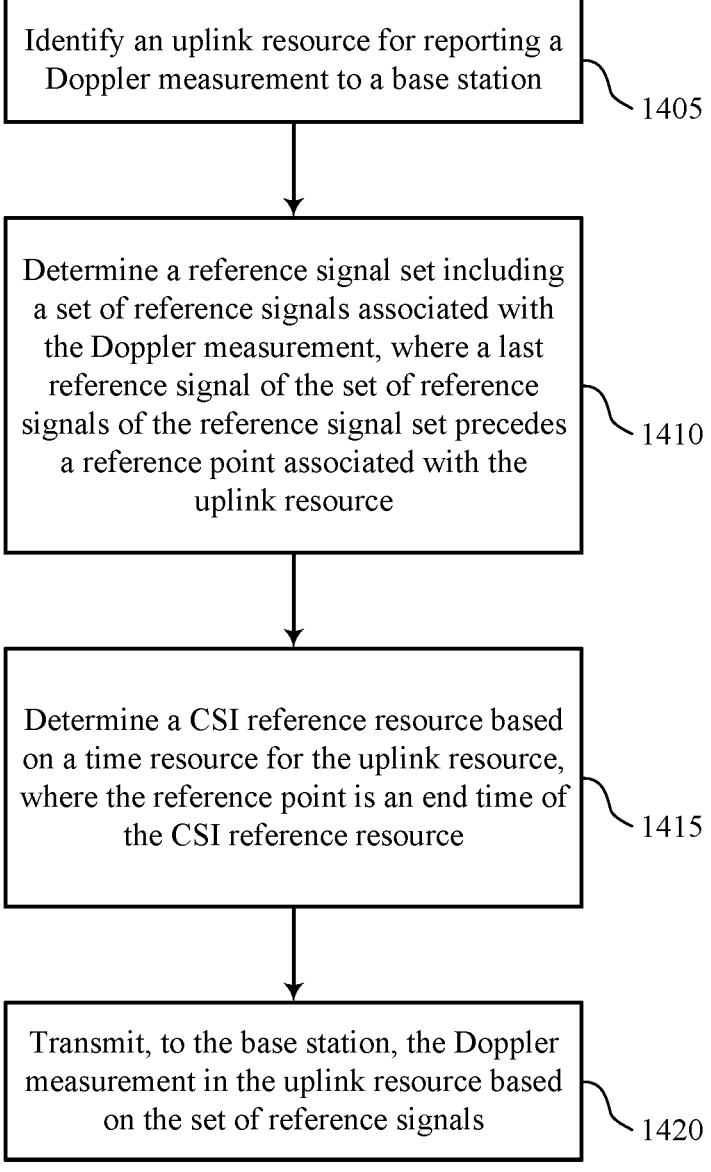

Identify an uplink resource for reporting a Doppler measurement to a base station

1405

Determine a reference signal set including a set of reference signals associated with the Doppler measurement, where a last reference signal of the set of reference signals of the reference signal set precedes a reference point associated with the uplink resource

1410

Determine a CSI reference resource based on a time resource for the uplink resource, where the reference point is an end time of the CSI reference resource

1415

Transmit, to the base station, the Doppler measurement in the uplink resource based on the set of reference signals

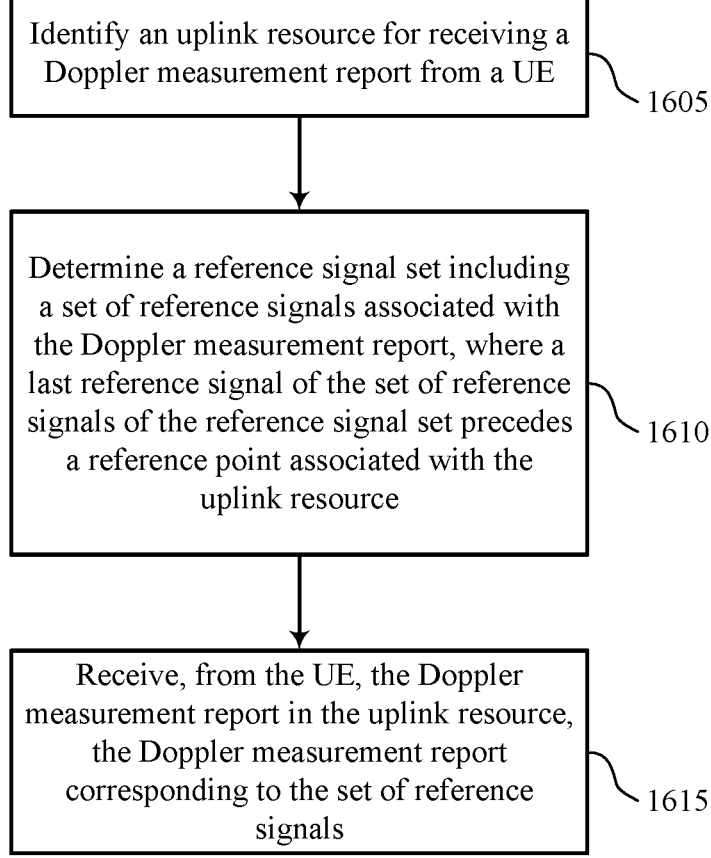

Identify an uplink resource for receiving a Doppler measurement report from a UE

1605

Determine a reference signal set including a set of reference signals associated with the Doppler measurement report, where a last reference signal of the set of reference signals of the reference signal set precedes a reference point associated with the uplink resource

1610

Receive, from the UE, the Doppler measurement report in the uplink resource, the Doppler measurement report corresponding to the set of reference signals

METHODS FOR MEASURING AND REPORTING DOPPLER SHIFT

CROSS REFERENCE

The present Application is a 371 national stage filing of International PCT Application No. PCT/CN2020/108880 by ZHANG et al. entitled "METHODS FOR MEASURING AND REPORTING DOPPLER SHIFT," filed Aug. 13, 2020, which is assigned to the assignee hereof, and which is expressly incorporated by reference in its entirety herein.

FIELD OF TECHNOLOGY

The following relates to wireless communications, including methods for measuring and reporting Doppler shift.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support methods for measuring and reporting Doppler shift. Generally, the described techniques provide for a UE to determine a reference signal set that precedes a reference point associated with an uplink resource (e.g., an uplink resource allocated for transmitting a measurement report) prior to performing Doppler measurements based on the reference signals in the reference signal set, which may improve communication efficiency between the UE and a base station (e.g., by increasing accuracy in Doppler shift measurements). In some cases, the reference signal set may include the reference signals from one or more transmission/reception points (TRPs) associated with a base station used for communicating with the UE. Each reference signal in the reference signal set may occur no later than a reference point such as a channel state information (CSI) reference resource, or an offset defined by a number of symbols relative to an uplink resource for transmitting the measurement report. In some cases, the base station may configure the UE with a time-domain restriction. In such examples, the UE may derive one or more channel measurements for computing the Doppler measurement in the Doppler measurement report transmitted in the uplink resource based on reference signals in an occasion of the reference signal set corresponding to the reference point. In some cases, the base station may not configure the UE with the time-domain restriction, and the UE may derive the channel measurement for computing the Doppler measurement based on one or more occasions of the reference signal sets. After the UE determines the Doppler measurement based on the reference signal set, or multiple reference signal sets, the UE may transmit the Doppler measurement to the base station in the uplink resource.

A method of wireless communications at a UE is described. The method may include identifying an uplink resource for reporting a Doppler measurement to a base station, determining a reference signal set including a set of reference signals associated with the Doppler measurement, where a last reference signal of the set of reference signals of the reference signal set precedes a reference point associated with the uplink resource, and transmitting, to the base station, the Doppler measurement in the uplink resource based on the set of reference signals.

An apparatus for wireless communications at a UE is described. The apparatus may include a processor, memory coupled with the processor, and instructions stored in the memory. The instructions may be executable by the processor to cause the apparatus to identify an uplink resource for reporting a Doppler measurement to a base station, determine a reference signal set including a set of reference signals associated with the Doppler measurement, where a last reference signal of the set of reference signals of the reference signal set precedes a reference point associated with the uplink resource, and transmit, to the base station, the Doppler measurement in the uplink resource based on the set of reference signals.

Another apparatus for wireless communications at a UE is described. The apparatus may include means for identifying an uplink resource for reporting a Doppler measurement to a base station, determining a reference signal set including a set of reference signals associated with the Doppler measurement, where a last reference signal of the set of reference signals of the reference signal set precedes a reference point associated with the uplink resource, and transmitting, to the base station, the Doppler measurement in the uplink resource based on the set of reference signals.

A non-transitory computer-readable medium storing code for wireless communications at a UE is described. The code may include instructions executable by a processor to identify an uplink resource for reporting a Doppler measurement to a base station, determine a reference signal set including a set of reference signals associated with the Doppler measurement, where a last reference signal of the set of reference signals of the reference signal set precedes a reference point associated with the uplink resource, and transmit, to the base station, the Doppler measurement in the uplink resource based on the set of reference signals.

In some examples of the method, apparatuses, and non-transitory computer-readable medium described herein, determining the reference signal set may include operations, features, means, or instructions for identifying a second reference signal set including a second set of reference signals associated with the Doppler measurement, where a first subset of the second set of refence signals precedes the reference point, and where a second subset of the second set of reference signals may be later in time than the reference point.

Some examples of the method, apparatuses, and non-transitory computer-readable medium described herein may further include operations, features, means, or instructions for determining a CSI reference resource based on a time resource for the uplink resource, where the reference point may be an end time of the CSI reference resource.

Some examples of the method, apparatuses, and non-transitory computer-readable medium described herein may further include operations, features, means, or instructions for determining the CSI reference resource based on a CSI report being a Doppler measure report type.

Some examples of the method, apparatuses, and non-transitory computer-readable medium described herein may further include operations, features, means, or instructions for determining an offset from the uplink resource based on a reporting configuration associated with the uplink resource, where the reference point may be the offset from the uplink resource.

In some examples of the method, apparatuses, and non-transitory computer-readable medium described herein, the reporting configuration may be associated with a fast CSI reporting type.

In some examples of the method, apparatuses, and non-transitory computer-readable medium described herein, the reporting configuration may be associated with a Doppler reporting type.

Some examples of the method, apparatuses, and non-transitory computer-readable medium described herein may further include operations, features, means, or instructions for identifying a time-domain restriction associated with the Doppler measurement may be configured, and measuring the set of reference signals from the determined reference signal set based on the time-domain restriction being configured.

Some examples of the method, apparatuses, and non-transitory computer-readable medium described herein may further include operations, features, means, or instructions for identifying a time-domain restriction associated with the Doppler measurement may be unconfigured, and measuring the set of reference signals from the determined reference signal set and one or more additional reference signal sets based on the time-domain restriction being unconfigured.

In some examples of the method, apparatuses, and non-transitory computer-readable medium described herein, the set of reference signals may be TRSs, CSI reference signals, SSB transmissions, or a combination thereof.

In some examples of the method, apparatuses, and non-transitory computer-readable medium described herein, the set of reference signals may be within one or more downlink slots and the uplink resource includes an uplink slot.

A method of wireless communications at a base station is described. The method may include identifying an uplink resource for receiving a Doppler measurement report from a UE, determining a reference signal set including a set of reference signals associated with the Doppler measurement report, where a last reference signal of the set of reference signals of the reference signal set precedes a reference point associated with the uplink resource, and receiving, from the UE, the Doppler measurement report in the uplink resource, the Doppler measurement report corresponding to the set of reference signals.

An apparatus for wireless communications at a base station is described. The apparatus may include a processor, memory coupled with the processor, and instructions stored in the memory. The instructions may be executable by the processor to cause the apparatus to identify an uplink resource for receiving a Doppler measurement report from a UE, determine a reference signal set including a set of reference signals associated with the Doppler measurement report, where a last reference signal of the set of reference signals of the reference signal set precedes a reference point associated with the uplink resource, and receive, from the UE, the Doppler measurement report in the uplink resource, the Doppler measurement report corresponding to the set of reference signals.

Another apparatus for wireless communications at a base station is described. The apparatus may include means for identifying an uplink resource for receiving a Doppler measurement report from a UE, determining a reference signal set including a set of reference signals associated with the Doppler measurement report, where a last reference signal of the set of reference signals of the reference signal set precedes a reference point associated with the uplink resource, and receiving, from the UE, the Doppler measurement report in the uplink resource, the Doppler measurement report corresponding to the set of reference signals.

A non-transitory computer-readable medium storing code for wireless communications at a base station is described. The code may include instructions executable by a processor to identify an uplink resource for receiving a Doppler measurement report from a UE, determine a reference signal set including a set of reference signals associated with the Doppler measurement report, where a last reference signal of the set of reference signals of the reference signal set precedes a reference point associated with the uplink resource, and receive, from the UE, the Doppler measurement report in the uplink resource, the Doppler measurement report corresponding to the set of reference signals.

In some examples of the method, apparatuses, and non-transitory computer-readable medium described herein, determining the reference signal set may include operations, features, means, or instructions for identifying a second reference signal set including a second set of reference signals associated with the Doppler measurement report, where a first subset of the second set of refence signals precedes the reference point, and where a second subset of the second set of reference signals may be later in time than the reference point.

Some examples of the method, apparatuses, and non-transitory computer-readable medium described herein may further include operations, features, means, or instructions for determining a CSI reference resource based on a time resource for the uplink resource, where the reference point may be an end time of the CSI reference resource.

Some examples of the method, apparatuses, and non-transitory computer-readable medium described herein may further include operations, features, means, or instructions for determining an offset from the uplink resource based on a reporting configuration associated with the uplink resource, where the reference point may be the offset from the uplink resource.

In some examples of the method, apparatuses, and non-transitory computer-readable medium described herein, the reporting configuration may be associated with a fast CSI reporting type.

In some examples of the method, apparatuses, and non-transitory computer-readable medium described herein, the reporting configuration may be associated with a Doppler reporting type.

Some examples of the method, apparatuses, and non-transitory computer-readable medium described herein may further include operations, features, means, or instructions for transmitting, to the UE, a message indicating a time-domain restriction configuration associated with the Doppler measurement report.

In some examples of the method, apparatuses, and non-transitory computer-readable medium described herein, the set of reference signals may be TRSs, CSI reference signals, SSB transmissions, or a combination thereof.

In some examples of the method, apparatuses, and non-transitory computer-readable medium described herein, the set of reference signals may be within one or more downlink slots and the uplink resource includes an uplink slot.

BRIEF DESCRIPTION OF THE DRAWINGS

FIGS. 13 through 16 show flowcharts illustrating methods that support methods for measuring and reporting Doppler shift in accordance with aspects of the present disclosure.

DETAILED DESCRIPTION

Figure 1:
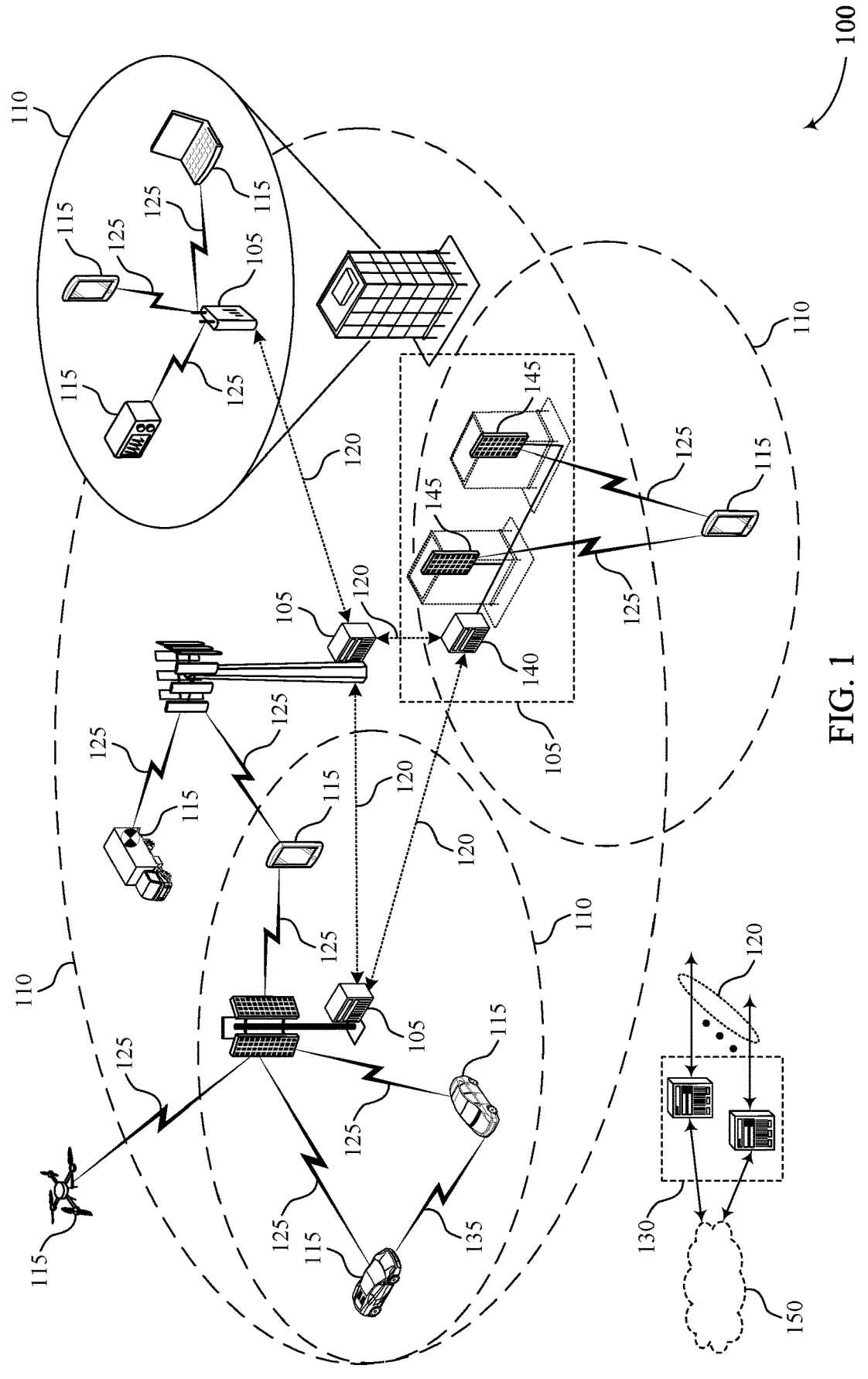
FIGS. 1 and 2 illustrate examples of wireless communications systems that support methods for measuring and reporting Doppler shift in accordance with aspects of the present disclosure.

In some cases, a user equipment (UE) may communicate with a base station using one or more transmission/reception points (TRPs). For example, the UE may receive a reference signal set (e.g., a group or burst of reference signals) including one or more reference signals from one or more TRPs. In some examples, the UE may be moving relatively fast when compared with the one or more TRPs and the base station. The UE may be capable of estimating Doppler metrics (e.g., a Doppler shift, a Doppler spread, or both) associated with each TRP based on the received reference signals. In some examples, the UE may indicate the measured Doppler metrics for each reference signal to the base station in a Doppler measurement report. In some cases, the UE may transmit the Doppler measurement report in a channel state information (CSI) report in an uplink channel resource (e.g., a physical uplink control channel (PUCCH) or a physical uplink shared channel (PUSCH) resource). The UE may transmit the CSI report (e.g., including the Doppler measurement report) according to a CSI reporting configuration indicated by control signaling. In some examples, one or more resources associated with the CSI report or the reference signals may be configured for performing or reporting channel measurements. In some examples, the UE may receive the resources and be configured to report CSI according to a periodic, semi-persistent, or aperiodic CSI reporting timeline. However, if the resources for the reference signals are relatively far apart in time (e.g., in different transmission periods), the measurement may be inaccurate. For example, the UE may measure one or more reference signals from a reference signal set (e.g., a burst of reference signals) and one or more reference signals from a previous reference signal set based on separately evaluating each reference signal, which may cause inaccurate Doppler shift measurements.

As described herein, a UE may evaluate or treat reference signal sets (e.g., reference signal bursts) as a whole instead of evaluating or treating reference resources separately. For example, a UE may determine a reference signal set that precedes a reference point associated with an uplink resource (e.g., PUCCH resource or PUSCH resource) prior to performing Doppler measurements based on the reference signals in the reference signal set, which may improve communication efficiency between the UE and a base station (e.g., by increasing accuracy in Doppler shift measurements). In some cases, the reference signal set may include the reference signals from one or more TRPs associated with a base station used for communicating with the UE. Each reference signal in the reference signal set may occur no later than a reference point relative to the uplink resource (e.g., a CSI reference resource or an offset relative to the uplink resource defined by a number of symbols). In some cases, the base station may configure the UE with a time-domain restriction. In such cases, the UE may derive one or more channel measurements for computing the Doppler measurement in the Doppler measurement report transmitted in the uplink resource (e.g., a slot) based on reference signals in a single occasion of the reference signal set (e.g., a most recent reference signal set) corresponding to the reference point. In some other cases, the base station may not configure the UE with the time-domain restriction, and in such cases, the UE may derive the channel measurement for computing the Doppler measurement based on one or more occasions of the reference signal sets. After the UE determines the Doppler measurement based on the reference signal set, or multiple reference signal sets, the UE may transmit the Doppler measurement to the base station in the uplink resource.

Aspects of the disclosure are initially described in the context of wireless communications systems. Aspects of the disclosure are further described in the context of timelines and a process flow. Aspects of the disclosure are further illustrated by and described with reference to apparatus diagrams, system diagrams, and flowcharts that relate to methods for measuring and reporting Doppler shift.

FIG. 1 illustrates an example of a wireless communications system 100 that supports methods for measuring and reporting Doppler shift in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may communicate with a serving cell, or a base station 105, using one or more TRPs, which may be an example of an access network transmission entity 145 (e.g., in a multi-TRP scenario). For example, the UE 115 may receive a reference signal set including one or more reference signals (e.g., four reference signals) from one or more TRPs. In some cases, each reference signal in a reference signal set may be a tracking reference signal (TRS), a channel state information (CSI) reference signal, or a synchronization signal block (SSB) transmission, or the like.

In some examples, wireless communications system 100 may be implemented in a high-speed train single frequency network (HST-SFN) scenario. That is, the UE 115 may be moving relatively fast when compared with the one or more TRPs. In some cases, the UE 115 may be capable of estimating Doppler metrics (e.g., a Doppler shift, a Doppler spread, or both) associated with each TRP based on the received reference signals. In some examples, the UE 115 may indicate the measured Doppler metrics (e.g., a measured Doppler shift, a measured Doppler spread, or both) for each reference signal to the base station 105 in a Doppler measurement report. In some cases, the report may improve the downlink performance (e.g., throughput of a physical downlink shared channel (PDSCH)) in a multi-TRP SFN and non-SFN scenario. For example, the network may pre-compensate the PDSCH with the Doppler shift, Doppler spread, or both that the UE 115 experiences. In some cases, the UE 115 may transmit the Doppler measurement report in a CSI report in an uplink channel resource (e.g., a PUCCH or a PUSCH resource).

In some cases, the UE 115 may transmit CSI reports (e.g., including the Doppler measurement report) according to CSI reporting configurations indicated by control signaling (e.g., a downlink control information (DCI) message, RRC signaling, a MAC-CE, or the like). In some examples, one or more resources associated with the CSI report or the reference signals may be configured for performing or reporting channel measurements (e.g., a reference signal received power (RSRP) measurement). In some examples, the UE 115 may receive the resources and be configured to transmit a CSI report according to a periodic, semi-persistent, or aperiodic CSI reporting timeline. In some cases, a UE may evaluate reference signals from a reference signal set individually, such that some reference signals of a resource set may be invalid (e.g., because they occur later in time than a reference point such as an end time of a CSI reference resource), whereas some reference signals of the same resource set may be valid. In such cases, the UE may use the valid reference signals of one resource set and combine them with one or more reference signals of a previous and different resource set. However, if the resources from these two different resource sets for the reference signals are relatively far apart in time (e.g., in different transmission periods), the Doppler measurement may be inaccurate. For example, the UE 115 may measure one or more reference signals from a reference signal set (e.g., a burst of reference signals) and one or more reference signals from a previous reference signal set based on separately evaluating each reference signal, which may cause inaccurate Doppler shift measurements.

In some examples, the UE 115 may determine a reference signal set, where all the reference signals in the reference signal set precedes a reference point associated with an uplink resource (e.g., PUCCH resource or PUSCH resource) prior to performing Doppler measurements, which may improve efficiency in wireless communication system 100 (e.g., by increasing accuracy in Doppler shift measurements). In some cases, the reference signal set may include the reference signals from one or more TRPs associated with a base station 105 used for communicating with the UE 115. Each reference signal in the reference signal set may occur no later than a CSI reference resource, or an offset defined by a number of symbols, which is described in further detail with respect to FIGS. 3A through 3C.

In some cases, the base station 105 may configure the UE 115 with a time-domain restriction. In such cases, the UE 115 may derive one or more channel measurements for computing the Doppler measurement in the Doppler measurement report transmitted in the uplink resource (e.g., a slot) based on reference signals in an occasion of the reference signal set corresponding to the reference point. In some cases, the base station 105 may not configure the UE 115 with the time-domain restriction, and in such cases, the UE 115 may derive the channel measurement for computing the Doppler measurement based on one or more occasions of the reference signal sets. After the UE 115 determines the Doppler measurement based on the reference signal set, or multiple reference signal sets, the UE 115 may transmit the Doppler measurement to the base station 105 in the uplink resource.

Figure 2:
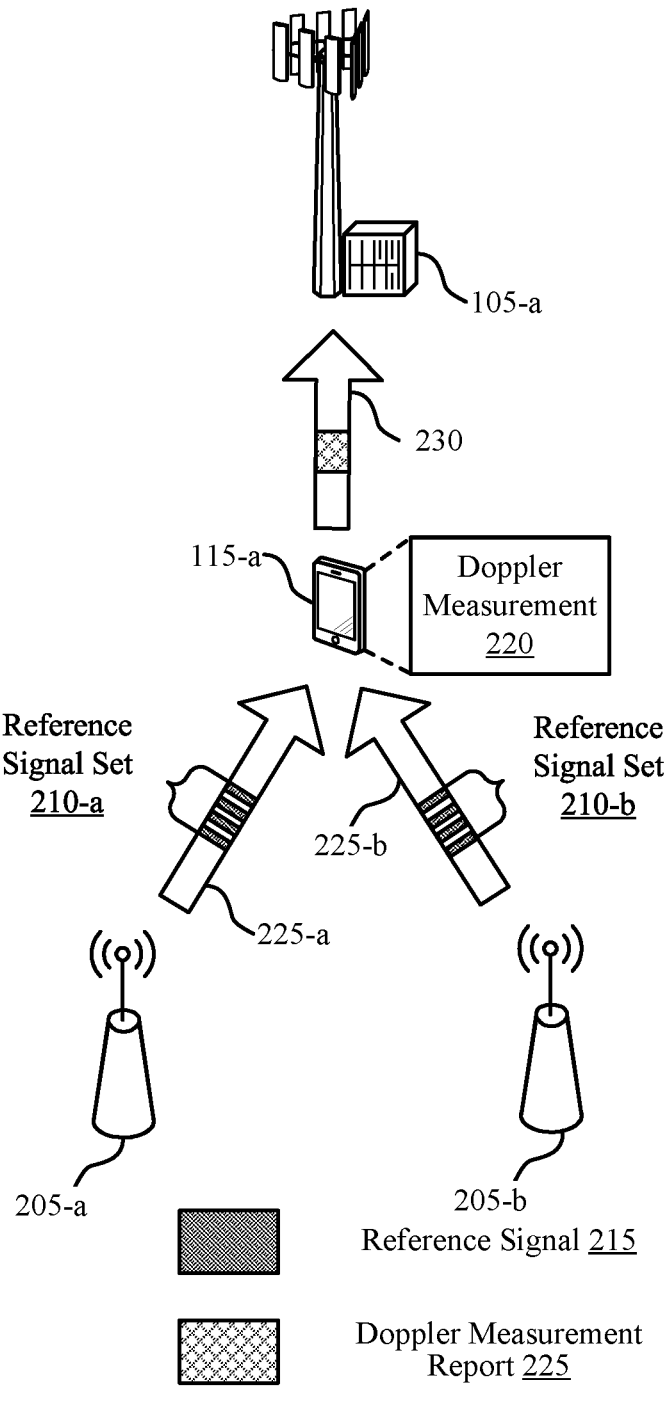

FIG. 2 illustrates an example of a wireless communications system 200 that supports methods for measuring and reporting Doppler shift in accordance with aspects of the present disclosure. In some examples, wireless communications system 200 may implement aspects of wireless communications system 100 and may include UE 115-a and base station 105-a, which may be examples of a UE 115 and a base station 105 as described with reference to FIG. 1. Additionally, the wireless communications system 200 may include TRPs 205, which may be examples of access network transmission entities 145 as described with reference to FIG. 1. In wireless communications system 200, UE 115-a may use a reference signal set 210 including one or more reference signals 215 to perform a Doppler measurement 220.

In some cases, a UE 115 may communicate with a serving cell, or a base station 105, using one or more TRPs (e.g., in a multi-TRP scenario). For example, UE 115-a may communicate with a serving cell using TRP 205-a and TRP 205-b and any additional TRPs 205 associated with the serving cell. For example, UE 115-a may receive a downlink transmission from one or more TRPs 205 associated with the base station 105. In some cases, the UE 115 and the TRPs 205 may be part of a single frequency network (SFN), in which the communication occurs over a frequency band. That is, the TRPs 205 and UE 115-a may communicate according to an SFN scenario using frequency bands within a range, such as frequency range 1 (FR1) (e.g., frequencies less than 6 GHz) or frequency range 2 (FR2) (frequencies between 24.25 and 52.6 GHz). In some examples, UE 115-a may receive one or more indications (e.g., via RRC signaling, MAC-CE signaling, DCI transmissions) of active transmission configuration indicator (TCI) states associated with receiving the downlink transmissions from TRP 205-a and TRP 205-b. For example, TRP 205-a, TRP 205-b, or both may transmit control signaling to UE 115-a indicating a corresponding TCI state for communications between TRP 205-a, TRP 205-b, or both and UE 115-a. In some cases, TRP 205-a and TRP 205-b may communicate with UE 115-a according to the same TCI state. In some cases, TRP 205-a and TRP 205-b may communicate with UE 115-a according to different TCI states.

In some examples, the UE 115 may receive a reference signal set 210 including one or more reference signals 215 (e.g., four reference signals 215) from one or more TRPs 205 via a downlink communication link 225. For example, UE 115-a may receive reference signal set 210-a from TRP 205-a on a downlink channel via downlink communication link 225-a. Additionally or alternatively, UE 115-a may receive reference signal set 210-b from TRP 205-b on a downlink channel via downlink communication link 225-b. In some cases, UE 115-a may receive reference signal set 210-a and reference signal set 210-b concurrently (e.g., in a larger reference signal set 210). In some other cases, UE 115-a may receive reference signal set 210-a during a first period, such as in one or more slots, and reference signal set 210-b in a second period, such as in a different one or more slots. The UE 115 may decode the reference signals 215 in a reference signal set 210 based on a TCI state associated with each reference signal 215.

In some cases, each reference signal 215 in a reference signal set 210 may be a tracking reference signal (TRS), a channel state information (CSI) reference signal, or a synchronization signal block (SSB) transmission or a similar reference signal. A base station 105 may configure the UE 115 with one or more CSI reference signal (CSI-RS) resource sets (e.g., a non-zero power (NZP) CSI-RS set) via control signaling, such as RRC singling. In some examples, the configuration may include one or more sets associated with FR1 and a set associated with FR2. Additionally or alternatively, the configuration may include one or more sets associated with FR2. Each set may include periodic NZP CSI-RS resources in consecutive slots (e.g., four periodic NZP CSI-RS resources in two consecutive slots or two periodic NZP CSI-RS resources in one slot). In some examples, a periodic or semi-persistent reference signal may not be linked to a CSI report, while an aperiodic reference signal may be linked to a CSI report configuration with a report quantity parameter set to none (i.e., reportQuantity=none).

In some examples, wireless communications system 200 may illustrate an example of a high-speed train SFN (HST-SFN) scenario. The UE 115-a may be moving relatively fast when compared with the one or more TRPs 205 (e.g., UE 115-a relative to TRP 205-a and TRP 205-b). In some cases, the UE 115-a may be capable of estimating Doppler metrics (e.g., a Doppler shift, a Doppler spread, or both) associated with each TRP 205 based on the received reference signals 215. For example, UE 115-a may use reference signals 215 associated with reference signal set 210-a and reference signals 215 associated with reference signal set 210-b to perform a Doppler measurement 220.

In some examples, the UE 115-a may indicate the measured Doppler metrics (e.g., a measured Doppler shift, a measured Doppler spread, or both) for each reference signal 215 to the base station 105 in a Doppler measurement report 225. In some cases, the report may improve the downlink performance (e.g., throughput of a PDSCH) in a multi-TRP SFN and non-SFN scenario. For example, the network may pre-compensate the PDSCH with the Doppler shift, Doppler spread, or both that the UE 115-*a* experiences. In some cases, the UE 115-*a* may transmit the Doppler measurement report in a CSI report in an uplink channel resource (e.g., a PUCCH or a PUSCH resource) via an uplink communication link 230. For example, UE 115-*a* may transmit a CSI report to base station 105-*a* including one or more additional fields (e.g., a reportQuantity field in CSI-ReportConfig) corresponding to the Doppler measurement report 225.

In some cases, the UE 115 may transmit CSI reports (e.g., including the Doppler measurement report 225) according to CSI reporting configurations indicated by control signaling (e.g., DCI signaling, RRC signaling, a MAC-CE, or the like). In some cases, the control signaling may configure a CSI report with resources associated with each reference signal 215. Additionally, the resources associated with each reference signal 215 may be associated with a TCI state (e.g., the TCI state associated with the reference signal 215). The UE 115 may transmit a CSI report including a Doppler measurement 220 associated with reference signals 215, where the Doppler measurement 220 indicates the TCI state (e.g., by a first TCI state index) associated with reference signals 210. In some cases, the CSI report configuration may be associated with one or more NZP CSI-RS sets (e.g., if the reportQuantity=Doppler).

In some examples, the control signaling configuring the CSI report may be linked to a reference signal (e.g., a CSI-RS) resource setting (e.g., a resourcesForChannelMeasurement setting) associated with channel measurement. That is, one or more resources associated with the CSI report or the reference signals 215 may be configured for performing or reporting channel measurements (e.g., a RSRP measurement). In some examples, the UE 115 may receive CSI-RS resources and be configured to report a CSI report according to a periodic, semi-persistent, or aperiodic CSI reporting timeline. However, if the resources for the reference signals 215 are relatively far apart in time (e.g., in different transmission periods), the measurement may be inaccurate. For example, the UE 115 may measure one or more reference signals 215 from a reference signal set 210 (e.g., a burst of reference signals) and one or more reference signals 215 from a previous reference signal set 210 based on separately evaluating each reference signal 215, which may cause inaccurate Doppler shift measurements.

In some examples, the UE 115 may determine a reference signal set 210 that precedes a reference point associated with an uplink resource (e.g., PUCCH resource or PUSCH resource) prior to performing Doppler measurements based on the reference signals 215 in the reference signal set 210, which may improve efficiency in wireless communication system 200 (e.g., by increasing accuracy in Doppler shift measurements). In some cases, the reference signal set 210 may include the reference signals 215 from one or more TRPs 205 associated with a base station 105 used for communicating with the UE 115. For example, UE 115-*a* may receive reference signal set 210-*a* from TRP 205-*a* and reference signal set 210-*b* from TRP 205-*b*. Each reference signal 215 in the reference signal set 210 may occur no later than a CSI reference resource (e.g., an end time of a CSI reference resource) or an offset relative to the uplink resource defined in terms of a number of symbols, which is described in further detail with respect to FIGS. 3A through 3C. For example, FIGS. 3A and 3B illustrate examples when the UE 115 receives a reference signal set 210 prior to the reference point, while FIG. 3C illustrates an example when the UE 115 receives a portion of the reference signal set 210 prior to the reference point and the other portion of the reference signal set 210 after the reference point.

In some cases, the base station 105-*a* may configure the UE 115 with a time-domain restriction. The UE 115 may derive one or more channel measurements for computing the Doppler measurement 220 in the Doppler measurement report 225 transmitted in the uplink resource (e.g., a slot) based on reference signals 215 in an occasion of the reference signal set 210 corresponding to the reference point. For example, UE 115-*a* may receive reference signal set 210-*a* from TRP 205-*a* and reference signal set 210-*b* from TRP 205-*b* prior to the reference point. If the time-domain restriction is configured, UE 115-*a* may perform the Doppler measurement 220 on either reference signal set 210-*a* or reference signal set 210-*b* (e.g., using just a single occasion of the reference signal set 210). In some cases, the base station 105-*a* may not configure the UE 115-*a* with the time-domain restriction. In such cases, the UE 115-*a* may derive the channel measurement for computing the Doppler measurement 220 based on one or more occasions of the reference signal sets 210. For example, UE 115-*a* may perform the Doppler measurement 220 on reference signal set 210-*a* and reference signal set 210-*b*. After the UE 115-*a* determines the Doppler measurement 220 based on the reference signal set 210, or multiple reference signal sets 210, the UE 115-*a* may transmit the Doppler measurement 220 to the base station 105-*a* in a Doppler measurement report 225. For example, UE 115-*a* may transmit the Doppler metrics for reference signals 215 in reference signal set 210-*a*, reference signal set 210-*b*, or both to base station 105-*a* in Doppler measurement report 225 in the uplink resource via the uplink communication link 230.

Figures 3A, 3B, 3C:
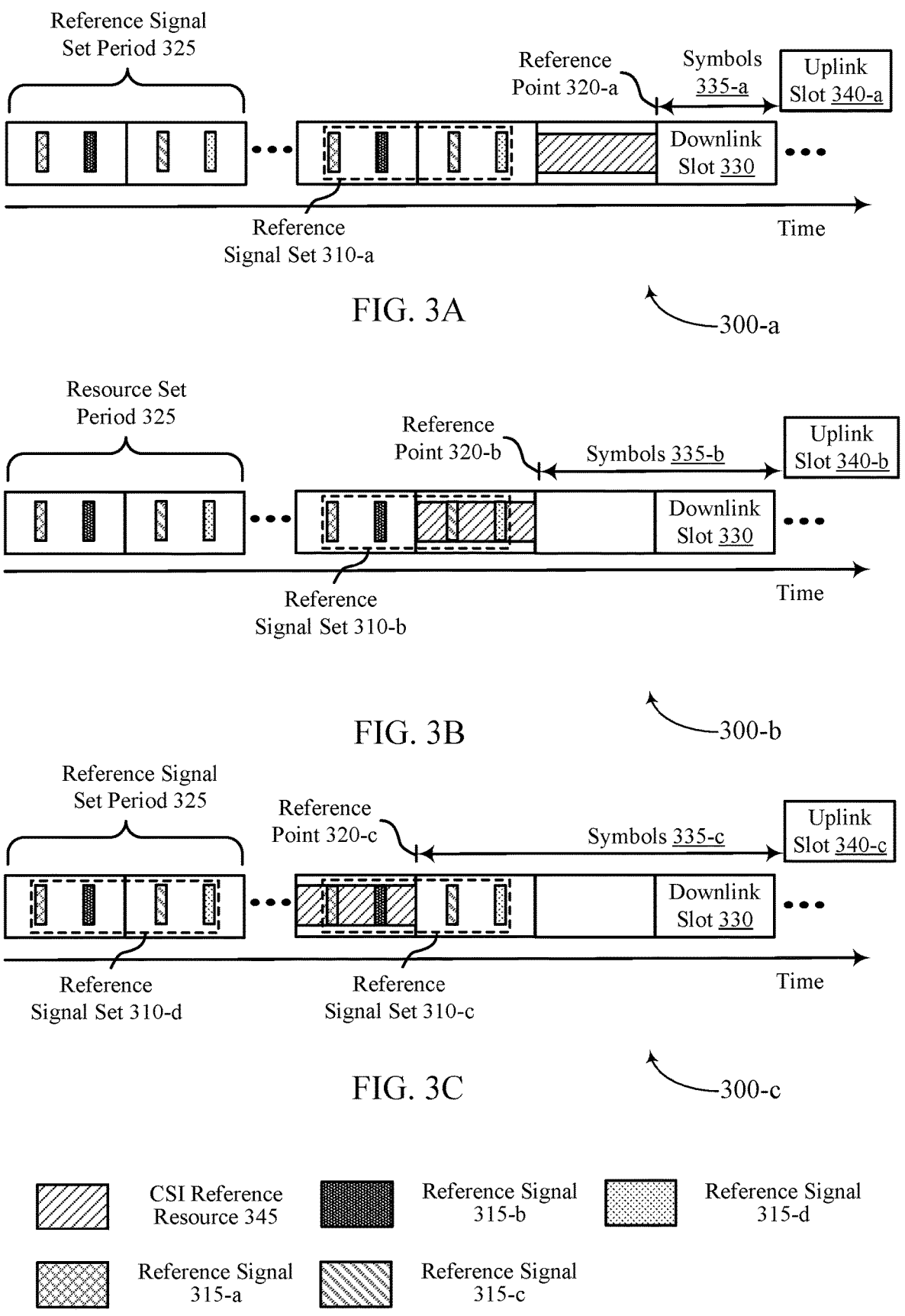
FIGS. 3A-3C illustrate examples of a timeline that supports methods for measuring and reporting Doppler shift in accordance with aspects of the present disclosure.

FIGS. 3A-3C illustrate examples of timelines 300 that support methods for measuring and reporting Doppler shift in accordance with aspects of the present disclosure. In some examples, timelines 300 may implement aspects of wireless communications system 100 or wireless communications system 200. Aspects of timelines 300 may be implemented by a UE 115, a base station 105, a TRP, 205 or a combination as described with reference to FIGS. 1 and 2. For example, timeline 300-*a* through timeline 300-*c* may include reference signal set 310-*a* through reference signal set 310-*d* with reference signal 315-*a* through reference signal 315-*d*, which may be an example of reference signal sets 210 and reference signals 215 as described with reference to FIG. 2. Generally, timeline 300-*a* of FIG. 3A and timeline 300-*b* of FIG. 3B illustrate examples of the described techniques when a UE 115 receives a (e.g., reference signal set 310-*a* and reference signal set 310-*b*) prior to a reference point 320-*a* and reference point 320-*b*, respectively. Timeline 300-*c* of FIG. 3C illustrates an example of the described techniques when the UE 115 receives reference signal set 310-*c* after the reference point 320-*c*.

In some cases, the UE 115 may receive one or more reference signals 315 in a reference signal set 310 from one or more TRPs 205, as described with reference to FIG. 2. For example, the UE 115 may receive four reference signals in a reference signal set 310 during a reference signal set period 325. As illustrated in FIGS. 3A through 3C, a reference signal set period 325 may be the duration of two downlink slots 330, or any other number of downlink slots 330. In some cases, a base station 105 may configure the UE 115 with the resources for receiving the reference signals 315 (e.g., directly via control signaling or indirectly using a TRP 205).

In some examples, the base station 105 may determine to configure the UE 115 with a reference point 320, or the UE 115 may otherwise determine the reference point 320, for identifying a reference signal set 310. The reference point 320 may be a number of symbols 335 from an uplink slot 340 (e.g., Z number of symbols, where values of Z may be preconfigured or stored in a table). For example, reference point 320-a may be a number of symbols 335-a from uplink slot 340-a, reference point 320-b may be a number of symbols 335-b from uplink slot 340-b, reference point 320-c may be a number of symbols 335-c from uplink slot 340-c. In some cases, the number of symbols 335-a, symbols 335-b, or symbols 335-c may be different. In some examples, when configured to report Doppler measurements, the UE 115 may reuse the configuration for the number of symbols for a fast CSI report type (e.g., without uplink shared channel symbols or feedback symbols, such as HARQ acknowledgement (ACK) symbols). In some other examples, a table or configuration may specify offset values specifically for Doppler reporting (e.g., by setting a reportQuantity to "doppler: or "cri-doppler"). As such, the UE 115 may use this offset value that is specific to Doppler reporting based on a Doppler report type being indicated in the CSI configuration. The number of symbols for the offset for Doppler reporting may depend on the subcarrier spacing.

Additionally or alternatively, the reference point 320 may be at the end of a CSI reference resource 345 (e.g., the last symbol of a CSI reference resource 345). In some cases, the UE 115 may identify the CSI reference resource based on the type of CSI to be included in the uplink slot 340. For example, the UE 115 may transmit a channel quality index (CQI) report (e.g., a PMI, RI, CQI, or the like), a beam report (e.g., a L1-RSRP or the like), a Doppler measurement report (e.g., a Doppler shift, a Doppler spread, or the like), or a combination thereof. The UE 115 may identify the CSI reference resource for reporting a Doppler measurement based on a field in control signaling, such as RRC control signaling, corresponding to a CSI report configuration. For example, the base station 105 may use a reportQuantity field in the CSI report configuration set to Doppler to indicate to the UE 115 that a CSI reference resource corresponds to a Doppler measurement report type.

In some cases, as illustrated in FIGS. 3A and 3B, the reference point 320 may be after the last reference signal 315 in a reference signal set 310. For example, in timeline 300-a, the UE 115 may receive an occasion of reference signal 315-a through reference signal 315-d in reference signal set 310-a. The UE 115 may receive reference signal 315-d at the end of reference signal set 310-a, but before reference point 320-a. Thus, the UE 115 may perform a Doppler measurement using the reference signals 315 in reference signal set 310-a, which may improve accuracy of the Doppler measurement because the reference signals 315 are in the same reference signal set period 325 (i.e., are close together in time than a reference signal set 310 with reference signals 315 in different reference signal set periods 325). Similarly, in timeline 300-b, the UE 115 may receive another occasion of reference signal 315-a through reference signal 315-d in reference signal set 310-b. The UE 115 may receive reference signal 315-d at the end of reference signal set 310-b, but before reference point 320-b. The UE 115 may perform the Doppler measurement using the reference signals 315 in reference signal set 310-b. As illustrated in timeline 300-b, the UE 115 may receive the reference signals 315 from a reference signal set within a CSI reference resource 345.

In some other cases, as illustrated in FIG. 3C, the reference point 320 may be before the last reference signal 315 in a reference signal set 310. For example, the UE 115 may receive an occasion of reference signal 315-a and reference signal 315-b prior to reference point 320-c, but an occasion of reference signal 315-c and reference signal 315-d after reference point 320-c. Thus, the UE 115 may not receive the reference signal set 310-c prior to the reference point 320-c. In such cases, rather than using the reference signals 315 from the reference signal set 310-c to perform the Doppler measurement, the UE 115 may use the reference signals 315 from reference signal set 310-d (e.g., a previous reference signal set).

In some cases, such as if the UE 115 is not configured with a time-domain restriction, the UE 115 may use multiple occasions of reference signal 315-a through reference signal 315-d to perform the Doppler measurement. For example, the UE 115 may use reference signal sets 310 in different reference signal set periods 325 that occur before a reference point 320 to perform the Doppler measurement. In some other cases, as illustrated in FIG. 3A through 3C, the UE 115 may use one reference signal set (e.g., reference signal set 310-a, reference signal set 310-b, or reference signal set 310-d) to perform the Doppler measurement if the base station 105 configures the UE 115 with a time-domain restriction.

Figure 4:
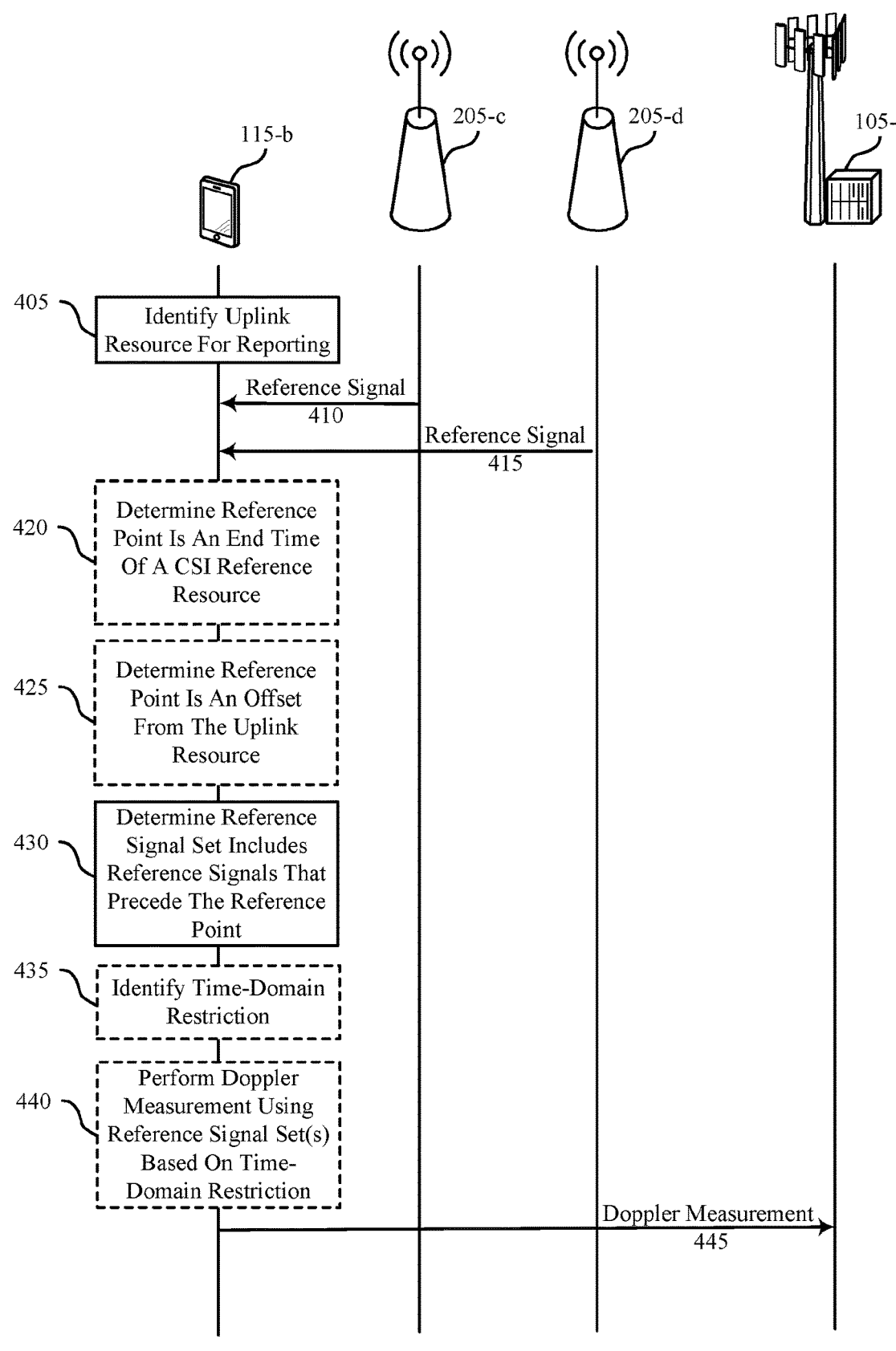
FIG. 4 illustrates an example of a process flow that supports methods for measuring and reporting Doppler shift in accordance with aspects of the present disclosure.

FIG. 4 illustrates an example of a process flow 400 that supports methods for measuring and reporting Doppler shift in accordance with aspects of the present disclosure. In some examples, process flow 400 may implement aspects of wireless communications system 100 or 200 as well as timelines 300. The process flow 400 may illustrate an example of a UE 115, such as UE 115-b, performing a Doppler measurement based on a reference signal set from one or more TRPs, such as TRP 405-a or TRP 405-b. The UE 115 may transmit the Doppler measurement in a report to a base station 105, such as base station 105-b. Alternative examples of the following may be implemented, where some processes are performed in a different order than described or are not performed. In some cases, processes may include additional features not mentioned below, or further processes may be added.

At 405, UE 115-b may identify an uplink resource (e.g., a PUCCH or PUSCH resource) for reporting a Doppler measurement to base station 105-a. The Doppler measurement report may be an example of a CSI report.

At 410 and 415, UE 115-b may receive one or more reference signals from TRP 205-c and TRP 205-d, respectively. The reference signals may make up a reference signal set. In some cases, the reference signals may be TRSs, CSI reference signals, SSB transmissions, or a combination of these reference signals. The reference signals may be within one or more downlink slots and the uplink resource may include an uplink slot.

At 420, UE 115-b may determine a CSI reference resource based on a time resource for the uplink resource. For example, the CSI reference resource may be in a slot relative to the uplink resource determined according to the formula $n - n_{CS\_ref}$. In some cases, the reference point may be at the end time (e.g., after the last symbol) of the CSI reference resource. In some cases, UE 115-a may determine the CSI reference resource based on the CSI report being a Doppler measure report type. In some examples, the UE 115-b may determine the CSI reference resource in the case of periodic or semi-persistent CSI reporting configuration.

At 425, UE 115-*b* may determine an offset from the uplink resource based on a reporting configuration associated with the uplink resource. For example, the offset may be a number of symbols (e.g., referred to as Z symbols) relative to the uplink resource. In some cases, base station 105-*b* may configure UE 115-*b* with the reporting configuration via RRC signaling or the like. In some examples, the reporting configuration may be associated with a fast CSI reporting type or a Doppler reporting type. That is, if the UE 115-*b* is configured for reporting Doppler measurements, a CSI configuration may indicate that the UE 115-*b* is to determine an offset Z value based on a fast CSI report configuration. In some examples, instead of reusing an offset Z value for a fast CSI report configuration, a CSI configuration may indicate that reportQuantity is set to "doppler" or "cri-doppler," which may indicate that the UE 115-*b* is to use a specific offset Z value specified for Doppler reporting. In some cases, being configured with an offset Z value may be used in cases of aperiodic CSI reporting.

At 430, UE 115-*b* may determine the reference signal set includes multiple reference signals associated with the Doppler measurement. In some cases, the last reference signal of the multiple reference signals precedes a reference point associated with the uplink resource. In such cases, the UE 115-*b* may use the reference signals of that reference signal set for Doppler measurement and reporting. In some cases, UE 115-*b* may identify a second reference signal set with reference signals associated with a Doppler measurement. A first subset of the reference signals in the second reference signal set may precede the reference point, while a second subset of the reference signals may be later in time than the reference point. In such cases, UE 115-*b* may determine the reference signal set at 430 for determining a Doppler measurement based on the first subset of the reference signals in the second reference signal set preceding the reference point and the second subset being later in time than the reference point. That is, because the some of the reference signals in the second reference signal set occur later in time than the reference point, the UE 115-*b* may not use the second reference signal set for Doppler measurement reporting, and may instead use a preceding reference signal set.

At 435, UE 115-*b* may identify a time-domain restriction associated with the Doppler measurement is configured (e.g., by base station 105-*b*) or unconfigured. At 440, if the time-domain restriction is configured, UE 115-*b* may perform a Doppler measurement using reference signals from the determined reference signal set. If the time-domain restriction is unconfigured (i.e., not configured by base station 105-*b*), UE 115-*b* may perform the Doppler measurement using reference signals from the determined reference signal set and one or more additional reference signal sets.

At 445, UE 115-*b* may transmit the Doppler measurement to base station 105-*b* in the uplink resource. The Doppler measurement may be based on the reference signals received from TRP 205-*c* and TRP 205-*d*.

Figure 5:
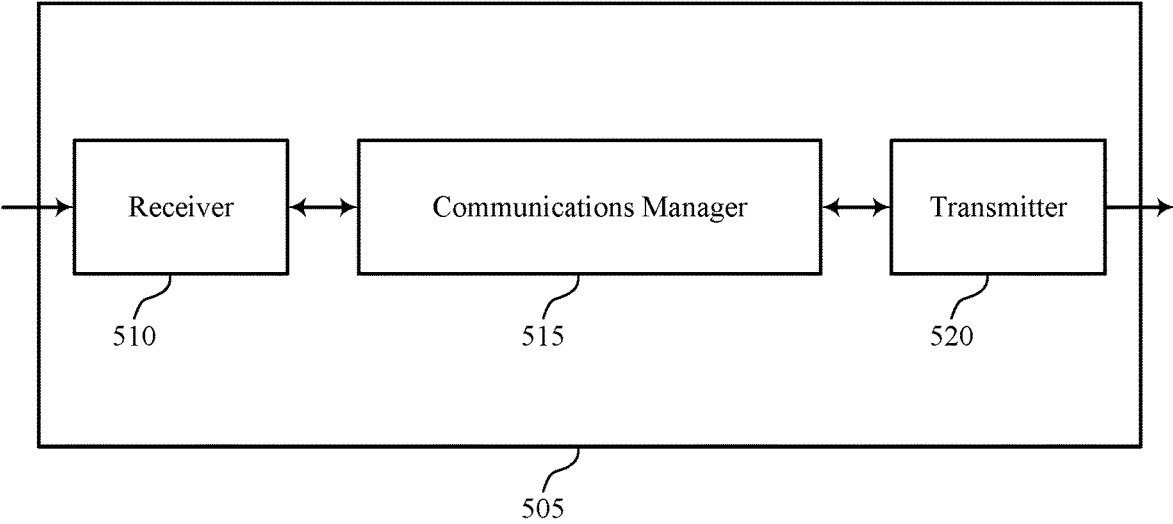
FIGS. 5 and 6 show block diagrams of devices that support methods for measuring and reporting Doppler shift in accordance with aspects of the present disclosure.

FIG. 5 shows a block diagram 500 of a device 505 that supports methods for measuring and reporting Doppler shift in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to methods for measuring and reporting Doppler shift, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify an uplink resource for reporting a Doppler measurement to a base station, determine a reference signal set including a set of reference signals associated with the Doppler measurement, where a last reference signal of the set of reference signals of the reference signal set precedes a reference point associated with the uplink resource, and transmit, to the base station, the Doppler measurement in the uplink resource based on the set of reference signals. The communications manager 515 may be an example of aspects of the communications manager 810 described herein.

The actions performed by the communications manager 515 as described herein may be implemented to realize one or more potential advantages. One implementation may enable a UE to determine a reference signal set precedes a reference point, perform a Doppler measurement on the reference signals in the reference signal set, and transmit the Doppler measurement to a base station. Performing the Doppler measurement on reference signals in the reference signal set may enable the UE to transmit the Doppler measurement relatively soon after performing the measurement, which may improve Doppler measurement accuracy, among other advantages.

Based on implementing the Doppler measurement per reference signal set as described herein, a processor of a UE or a base station (e.g., a processor controlling the receiver 510, the communications manager 515, the transmitter 520, or a combination thereof) may reduce the impact or likelihood of high signaling overhead due to inaccurate Doppler measurements while ensuring relatively efficient communications. For example, the Doppler measurement techniques described herein may leverage a reference point based on an uplink resource to determine a reference signal set, which may realize reduced volume of retransmissions and a better channel resources utilization, among other benefits.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
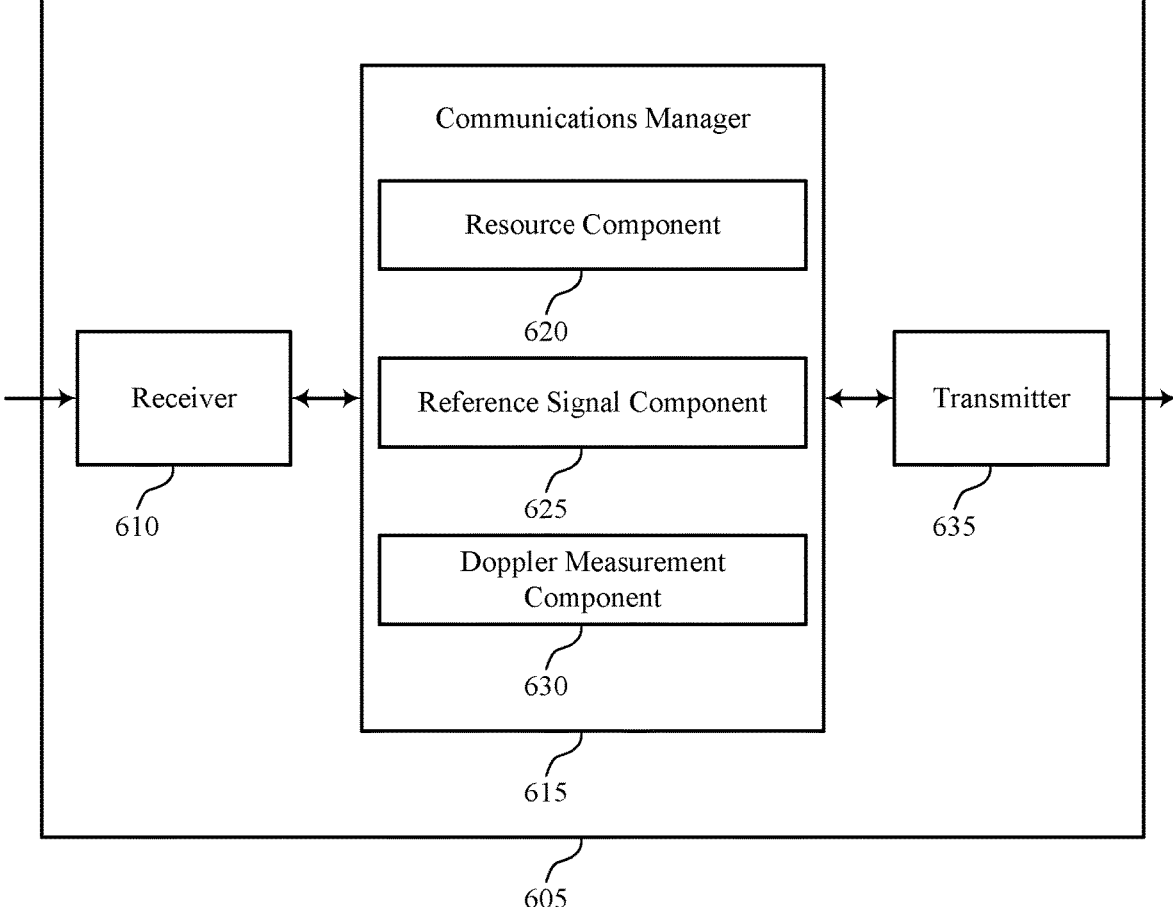

FIG. 6 shows a block diagram 600 of a device 605 that supports methods for measuring and reporting Doppler shift in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to methods for measuring and reporting Doppler shift, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a resource component 620, a reference signal component 625, and a doppler measurement component 630. The communications manager 615 may be an example of aspects of the communications manager 810 described herein.

The resource component 620 may identify an uplink resource for reporting a Doppler measurement to a base station. The reference signal component 625 may determine a reference signal set including a set of reference signals associated with the Doppler measurement, where a last reference signal of the set of reference signals of the reference signal set precedes a reference point associated with the uplink resource. The Doppler measurement component 630 may transmit, to the base station, the Doppler measurement in the uplink resource based on the set of reference signals.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
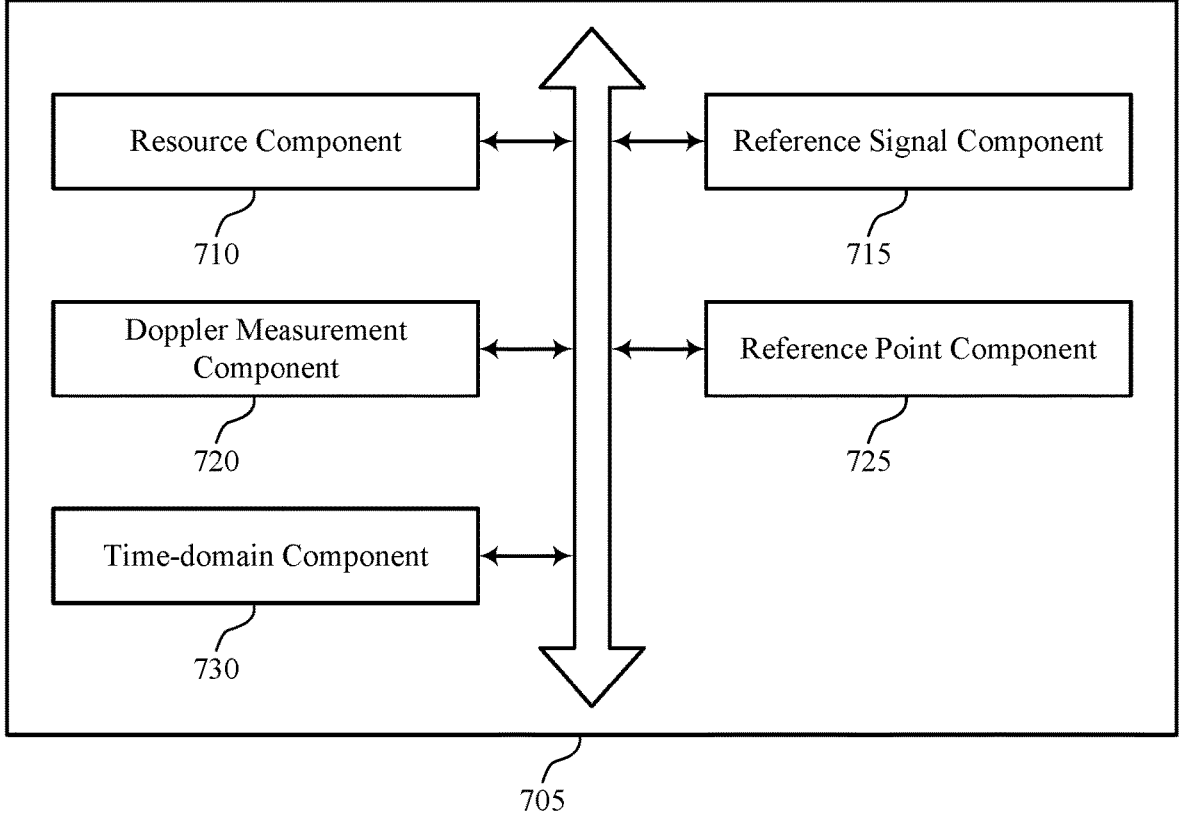
FIG. 7 shows a block diagram of a communications manager that supports methods for measuring and reporting Doppler shift in accordance with aspects of the present disclosure.

FIG. 7 shows a block diagram 700 of a communications manager 705 that supports methods for measuring and reporting Doppler shift in accordance with aspects of the present disclosure. The communications manager 705 may be an example of aspects of a communications manager 515, a communications manager 615, or a communications manager 810 described herein. The communications manager 705 may include a resource component 710, a reference signal component 715, a doppler measurement component 720, a reference point component 725, and a time-domain component 730. Each of these modules may communicate, directly or indirectly, with one another (e.g., via one or more buses).

The resource component 710 may identify an uplink resource for reporting a Doppler measurement to a base station. The reference signal component 715 may determine a reference signal set including a set of reference signals associated with the Doppler measurement, where a last reference signal of the set of reference signals of the reference signal set precedes a reference point associated with the uplink resource. In some cases, the set of reference signals are within one or more downlink slots and the uplink resource includes an uplink slot.

In some examples, the reference signal component 715 may identify a second reference signal set including a second set of reference signals associated with the Doppler measurement, where a first subset of the second set of refence signals precedes the reference point, and where a second subset of the second set of reference signals is later in time than the reference point. In some cases, the set of reference signals are TRSs, CSI reference signals, SSB transmissions, or a combination thereof.

The reference point component 725 may determine a CSI reference resource based on a time resource for the uplink resource, where the reference point is an end time of the CSI reference resource. In some examples, the reference point component 725 may determine the CSI reference resource based on a CSI report being a Doppler measure report type.

In some examples, the reference point component 725 may determine an offset from the uplink resource based on a reporting configuration associated with the uplink resource, where the reference point is the offset from the uplink resource. In some cases, the reporting configuration is associated with a fast CSI reporting type. In some cases, the reporting configuration is associated with a Doppler reporting type.

The time-domain component 730 may identify a time-domain restriction associated with the Doppler measurement is configured. In some examples, the time-domain component 730 may measure the set of reference signals from the determined reference signal set based on the time-domain restriction being configured.

In some examples, the time-domain component 730 may identify a time-domain restriction associated with the Doppler measurement is unconfigured. In some examples, the time-domain component 730 may measure the set of reference signals from the determined reference signal set and one or more additional reference signal sets based on the time-domain restriction being unconfigured.

The Doppler measurement component 720 may transmit, to the base station, the Doppler measurement in the uplink resource based on the set of reference signals.

Figure 8:
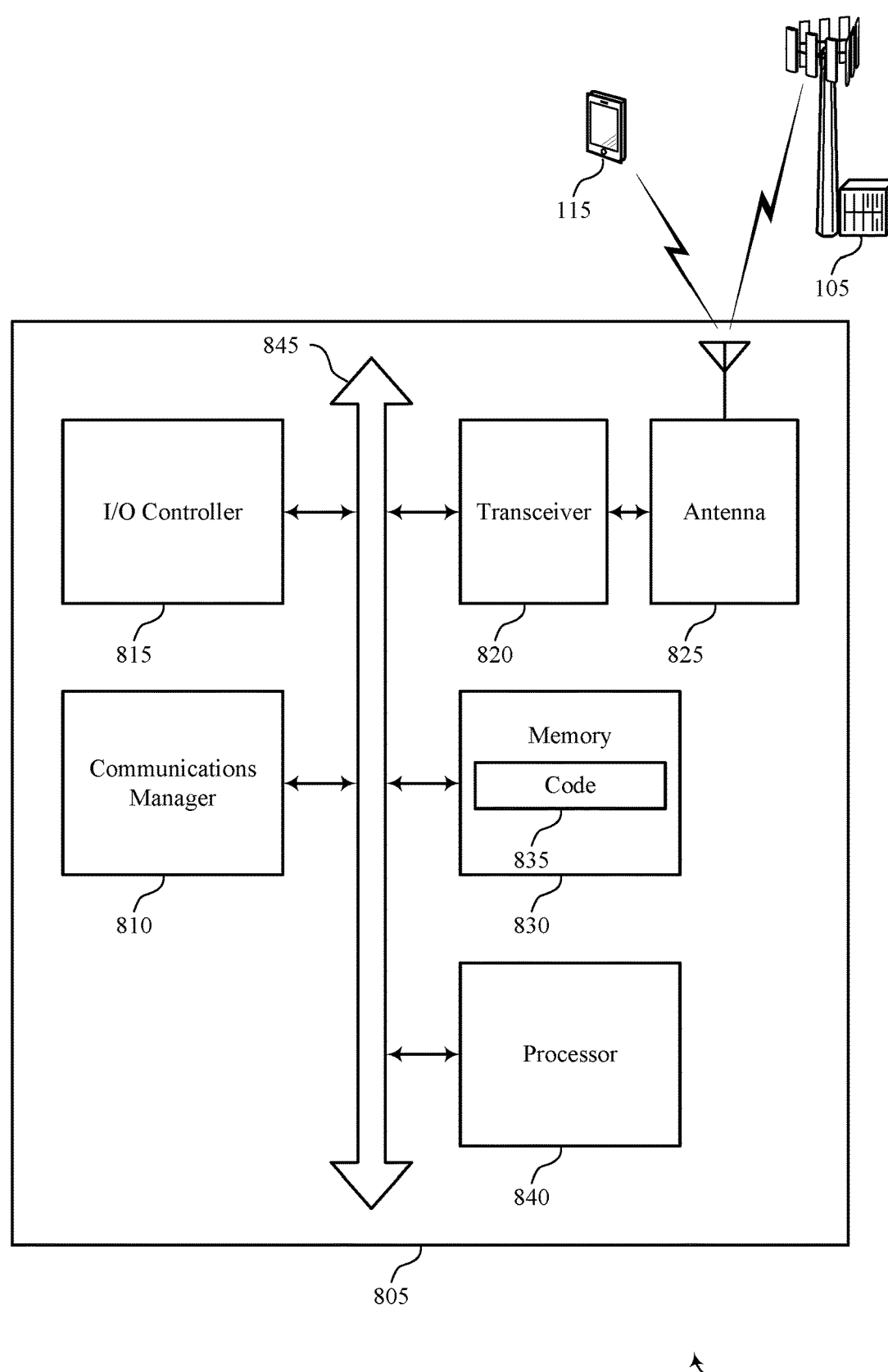
FIG. 8 shows a diagram of a system including a device that supports methods for measuring and reporting Doppler shift in accordance with aspects of the present disclosure.

FIG. 8 shows a diagram of a system 800 including a device 805 that supports methods for measuring and reporting Doppler shift in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify an uplink resource for reporting a Doppler measurement to a base station, determine a reference signal set including a set of reference signals associated with the Doppler measurement, where a last reference signal of the set of reference signals of the reference signal set precedes a reference point associated with the uplink resource, and transmit, to the base station, the Doppler measurement in the uplink resource based on the set of reference signals.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a digital signaling processor (DSP), a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting methods for measuring and reporting Doppler shift).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
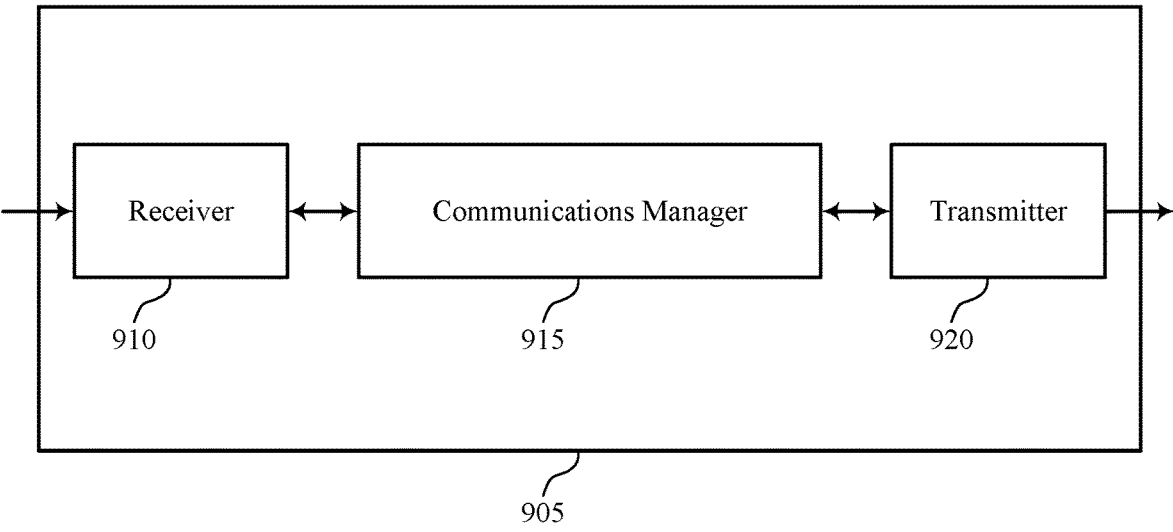
FIGS. 9 and 10 show block diagrams of devices that support methods for measuring and reporting Doppler shift in accordance with aspects of the present disclosure.

FIG. 9 shows a block diagram 900 of a device 905 that supports methods for measuring and reporting Doppler shift in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to methods for measuring and reporting Doppler shift, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify an uplink resource for receiving a Doppler measurement report from a UE, determine a reference signal set including a set of reference signals associated with the Doppler measurement report, where a last reference signal of the set of reference signals of the reference signal set precedes a reference point associated with the uplink resource, and receive, from the UE, the Doppler measurement report in the uplink resource, the Doppler measurement report corresponding to the set of reference signals. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
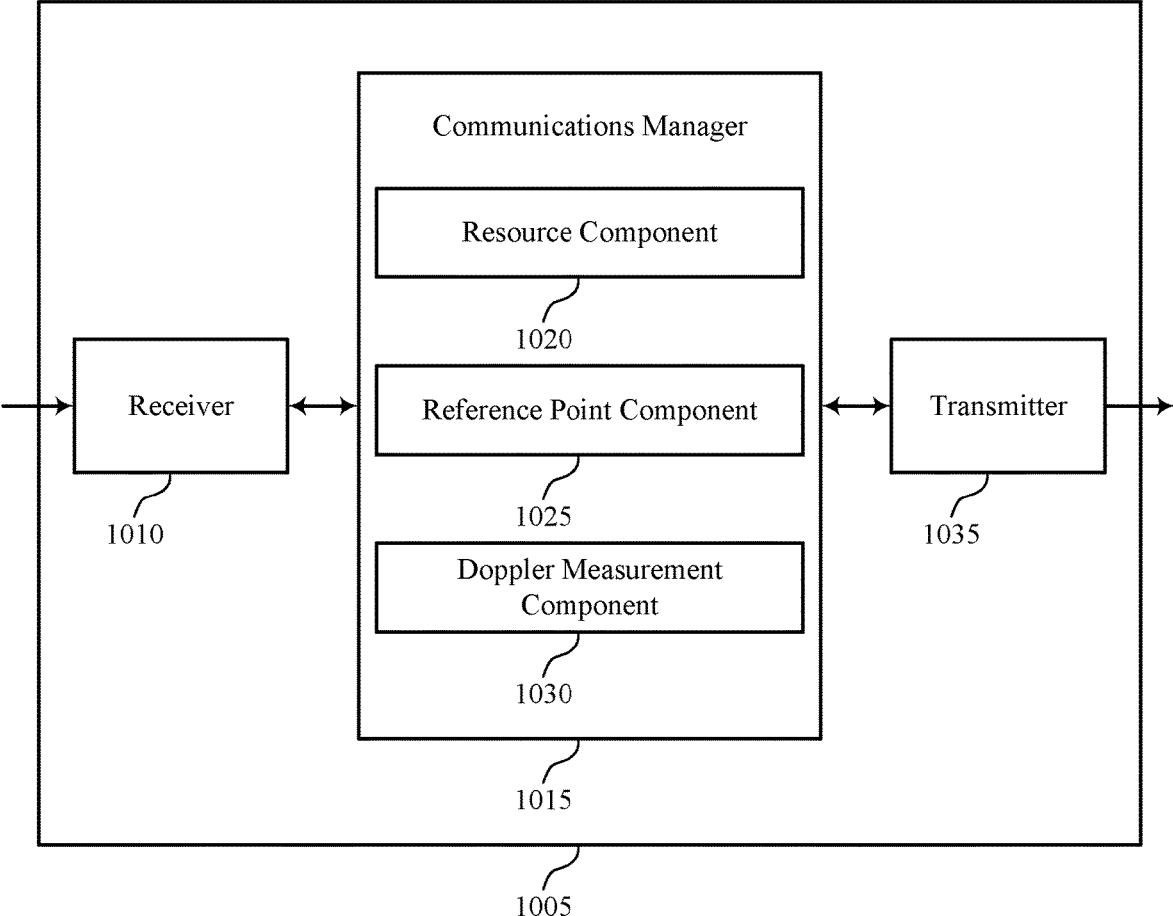

FIG. 10 shows a block diagram 1000 of a device 1005 that supports methods for measuring and reporting Doppler shift in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to methods for measuring and reporting Doppler shift, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a resource component 1020, a reference point component 1025, and a doppler measurement component 1030. The communications manager 1015 may be an example of aspects of the communications manager 1210 described herein.

The resource component 1020 may identify an uplink resource for receiving a Doppler measurement report from a UE. The reference point component 1025 may determine a reference signal set including a set of reference signals associated with the Doppler measurement report, where a last reference signal of the set of reference signals of the reference signal set precedes a reference point associated with the uplink resource. The Doppler measurement component 1030 may receive, from the UE, the Doppler measurement report in the uplink resource, the Doppler measurement report corresponding to the set of reference signals.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
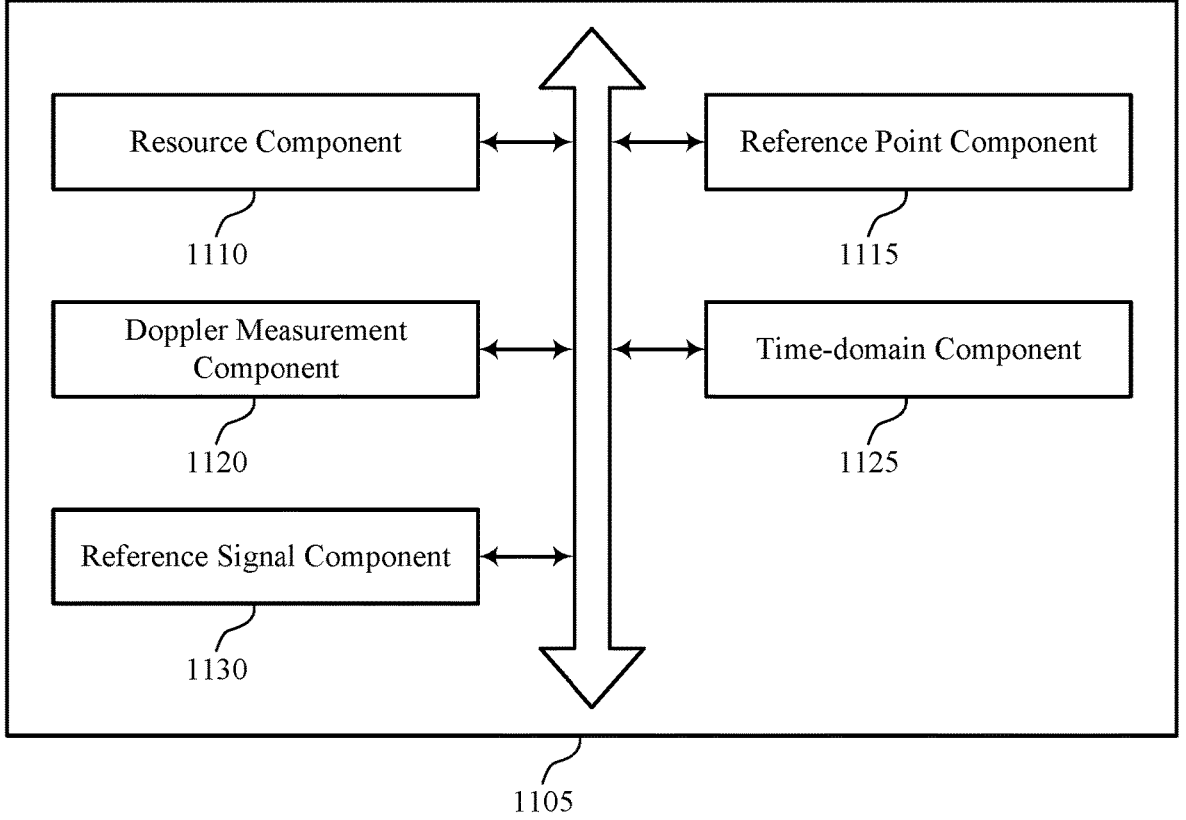
FIG. 11 shows a block diagram of a communications manager that supports methods for measuring and reporting Doppler shift in accordance with aspects of the present disclosure.

FIG. 11 shows a block diagram 1100 of a communications manager 1105 that supports methods for measuring and reporting Doppler shift in accordance with aspects of the present disclosure. The communications manager 1105 may be an example of aspects of a communications manager 915, a communications manager 1015, or a communications manager 1210 described herein. The communications manager 1105 may include a resource component 1110, a reference point component 1115, a doppler measurement component 1120, a time-domain component 1125, and a reference signal component 1130. Each of these modules may communicate, directly or indirectly, with one another (e.g., via one or more buses).

The resource component 1110 may identify an uplink resource for receiving a Doppler measurement report from a UE. The reference point component 1115 may determine a reference signal set including a set of reference signals associated with the Doppler measurement report, where a last reference signal of the set of reference signals of the reference signal set precedes a reference point associated with the uplink resource. In some cases, the set of reference signals are within one or more downlink slots and the uplink resource includes an uplink slot. The reference signal component 1130 may determine the set of reference signals are TRSs, CSI reference signals, SSB transmissions, or a combination thereof.

In some examples, the reference point component 1115 may identify a second reference signal set including a second set of reference signals associated with the Doppler measurement report, where a first subset of the second set of refence signals precedes the reference point, and where a second subset of the second set of reference signals is later in time than the reference point.

In some examples, the reference point component 1115 may determine a CSI reference resource based on a time resource for the uplink resource, where the reference point is an end time of the CSI reference resource.

In some examples, the reference point component 1115 may determine an offset from the uplink resource based on a reporting configuration associated with the uplink resource, where the reference point is the offset from the uplink resource. In some cases, the reporting configuration is associated with a fast CSI reporting type. In some cases, the reporting configuration is associated with a Doppler reporting type.

The time-domain component 1125 may transmit, to the UE, a message indicating a time-domain restriction configuration associated with the Doppler measurement report.

The Doppler measurement component 1120 may receive, from the UE, the Doppler measurement report in the uplink resource, the Doppler measurement report corresponding to the set of reference signals.

Figure 12:
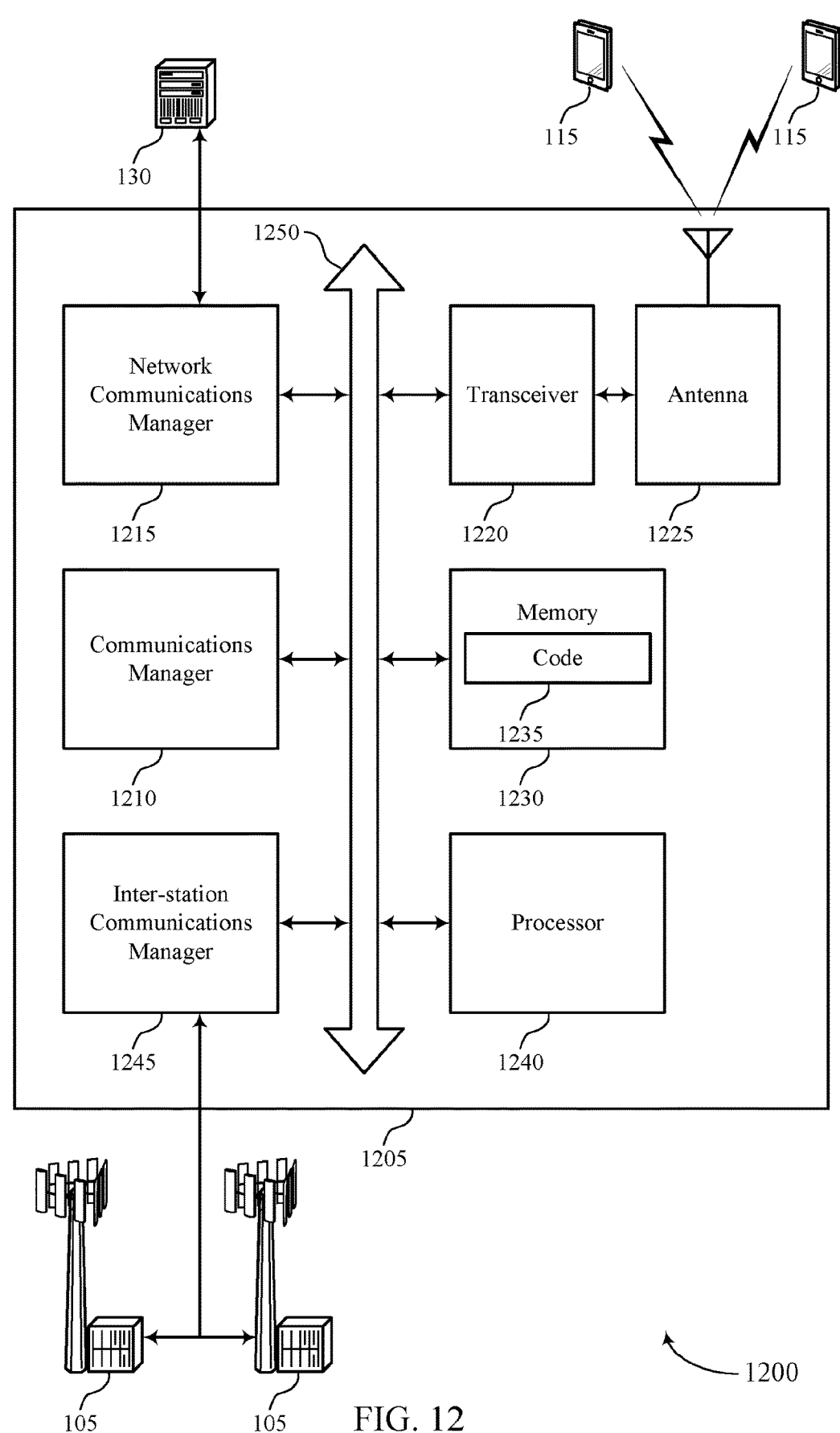
FIG. 12 shows a diagram of a system including a device that supports methods for measuring and reporting Doppler shift in accordance with aspects of the present disclosure.

FIG. 12 shows a diagram of a system 1200 including a device 1205 that supports methods for measuring and reporting Doppler shift in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify an uplink resource for receiving a Doppler measurement report from a UE, determine a reference signal set including a set of reference signals associated with the Doppler measurement report, where a last reference signal of the set of reference signals of the reference signal set precedes a reference point associated with the uplink resource, and receive, from the UE, the Doppler measurement report in the uplink resource, the Doppler measurement report corresponding to the set of reference signals.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting methods for measuring and reporting Doppler shift).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 that supports methods for measuring and reporting Doppler shift in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify an uplink resource for reporting a Doppler measurement to a base station. The operations of 1305 may be performed according to the methods described herein. In some examples, aspects of the operations of 1305 may be performed by a resource component as described with reference to FIGS. 5 through 8.

At 1310, the UE may determine a reference signal set including a set of reference signals associated with the Doppler measurement, where a last reference signal of the set of reference signals of the reference signal set precedes a reference point associated with the uplink resource. The operations of 1310 may be performed according to the methods described herein. In some examples, aspects of the operations of 1310 may be performed by a reference signal component as described with reference to FIGS. 5 through 8.

At 1315, the UE may transmit, to the base station, the Doppler measurement in the uplink resource based on the set of reference signals. The operations of 1315 may be performed according to the methods described herein. In some examples, aspects of the operations of 1315 may be performed by a Doppler measurement component as described with reference to FIGS. 5 through 8.

FIG. 14 shows a flowchart illustrating a method 1400 that supports methods for measuring and reporting Doppler shift in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify an uplink resource for reporting a Doppler measurement to a base station. The operations of 1405 may be performed according to the methods described herein. In some examples, aspects of the operations of 1405 may be performed by a resource component as described with reference to FIGS. 5 through 8.

At 1410, the UE may determine a reference signal set including a set of reference signals associated with the Doppler measurement, where a last reference signal of the set of reference signals of the reference signal set precedes a reference point associated with the uplink resource. The operations of 1410 may be performed according to the methods described herein. In some examples, aspects of the operations of 1410 may be performed by a reference signal component as described with reference to FIGS. 5 through 8.

At 1415, the UE may determine a CSI reference resource based on a time resource for the uplink resource, where the reference point is an end time of the CSI reference resource. The operations of 1415 may be performed according to the methods described herein. In some examples, aspects of the operations of 1415 may be performed by a reference point component as described with reference to FIGS. 5 through 8.

At 1420, the UE may transmit, to the base station, the Doppler measurement in the uplink resource based on the set of reference signals. The operations of 1420 may be performed according to the methods described herein. In some examples, aspects of the operations of 1420 may be performed by a Doppler measurement component as described with reference to FIGS. 5 through 8.

Figure 15:
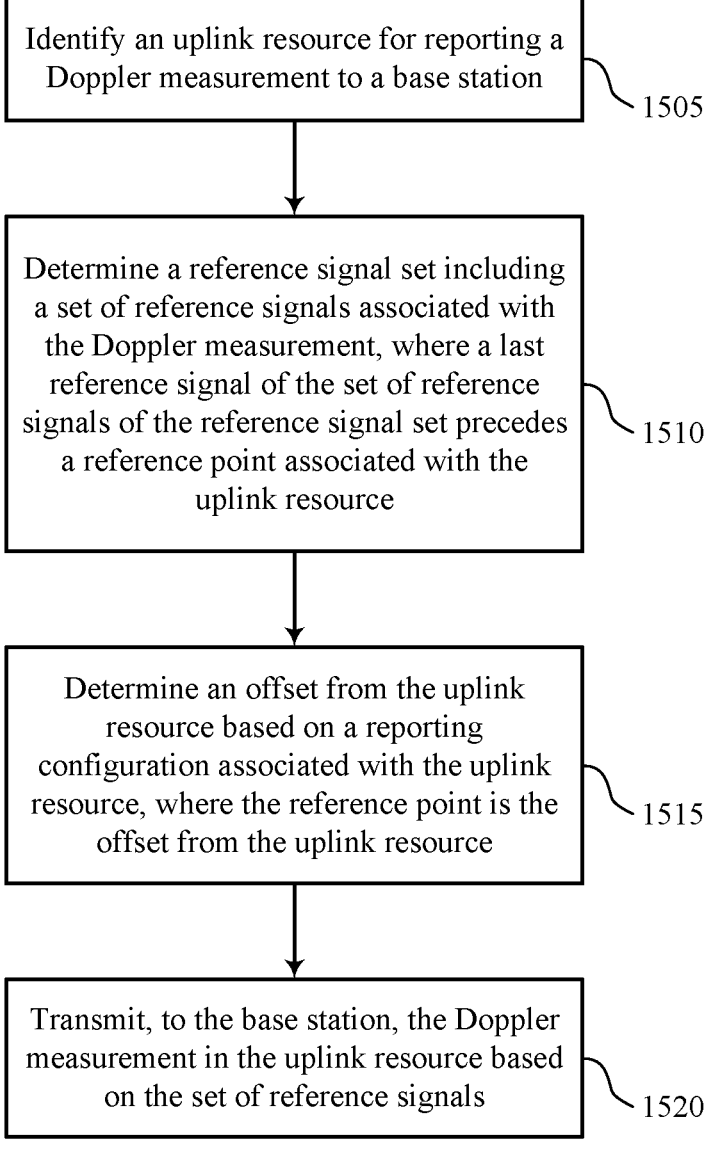

FIG. 15 shows a flowchart illustrating a method 1500 that supports methods for measuring and reporting Doppler shift in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify an uplink resource for reporting a Doppler measurement to a base station. The operations of 1505 may be performed according to the methods described herein. In some examples, aspects of the operations of 1505 may be performed by a resource component as described with reference to FIGS. 5 through 8.

At 1510, the UE may determine a reference signal set including a set of reference signals associated with the Doppler measurement, where a last reference signal of the set of reference signals of the reference signal set precedes a reference point associated with the uplink resource. The operations of 1510 may be performed according to the methods described herein. In some examples, aspects of the operations of 1510 may be performed by a reference signal component as described with reference to FIGS. 5 through 8.

At 1515, the UE may determine an offset from the uplink resource based on a reporting configuration associated with the uplink resource, where the reference point is the offset from the uplink resource. The operations of 1515 may be performed according to the methods described herein. In some examples, aspects of the operations of 1515 may be performed by a reference point component as described with reference to FIGS. 5 through 8.

At 1520, the UE may transmit, to the base station, the Doppler measurement in the uplink resource based on the set of reference signals. The operations of 1520 may be performed according to the methods described herein. In some examples, aspects of the operations of 1520 may be performed by a Doppler measurement component as described with reference to FIGS. 5 through 8.

FIG. 16 shows a flowchart illustrating a method 1600 that supports methods for measuring and reporting Doppler shift in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify an uplink resource for receiving a Doppler measurement report from a UE. The operations of 1605 may be performed according to the methods described herein. In some examples, aspects of the operations of 1605 may be performed by a resource component as described with reference to FIGS. 9 through 12.

At 1610, the base station may determine a reference signal set including a set of reference signals associated with the Doppler measurement report, where a last reference signal of the set of reference signals of the reference signal set precedes a reference point associated with the uplink resource. The operations of 1610 may be performed according to the methods described herein. In some examples, aspects of the operations of 1610 may be performed by a reference point component as described with reference to FIGS. 9 through 12.

At 1615, the base station may receive, from the UE, the Doppler measurement report in the uplink resource, the Doppler measurement report corresponding to the set of reference signals. The operations of 1615 may be performed according to the methods described herein. In some examples, aspects of the operations of 1615 may be performed by a Doppler measurement component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:
  one or more memories storing processor-executable code; and one or more processors coupled with the one or more memories and individually or collectively operable to execute the code to cause the UE to:
  determine an uplink resource for reporting a Doppler measurement to a network entity;
  determine a reference signal set comprising a plurality of reference signals associated with the Doppler measurement, wherein a last reference signal of the plurality of reference signals of the reference signal set precedes a reference point associated with the uplink resource for reporting the Doppler measurement; and
  transmit the Doppler measurement in the uplink resource based at least in part on the plurality of reference signals.

2. The UE of claim 1, wherein, to determine the reference signal set, the one or more processors are individually or collectively operable to execute the code to cause the UE to:
  determine a second reference signal set comprising a second plurality of reference signals associated with the Doppler measurement, wherein a first subset of the second plurality of reference signals precedes the reference point, and wherein a second subset of the second plurality of reference signals is later in time than the reference point.

3. The UE of claim 1, wherein the one or more processors are individually or collectively further operable to cause the UE to:
  determine a channel state information reference resource based at least in part on a time resource for the uplink resource, wherein the reference point is an end time of the channel state information reference resource.

4. The UE of claim 3, wherein the one or more processors are individually or collectively further operable to cause the UE to:
  determine the channel state information reference resource based at least in part on a channel state information report being a Doppler measure report type.

5. The UE of claim 1, wherein the one or more processors are individually or collectively further operable to cause the UE to:
  determine an offset from the uplink resource based at least in part on a reporting configuration associated with the uplink resource, wherein the reference point is the offset from the uplink resource.

6. The UE of claim 5, wherein the reporting configuration is associated with a fast channel state information reporting type.

7. The UE of claim 5, wherein the reporting configuration is associated with a Doppler reporting type.

8. The UE of claim 1, wherein the one or more processors are individually or collectively further operable to cause the UE to:
  determine a time-domain restriction associated with the Doppler measurement is configured; and
  measure the plurality of reference signals from the determined reference signal set based at least in part on the time-domain restriction being configured.

9. The UE of claim 1, wherein the one or more processors are individually or collectively further operable to cause the UE to:
  determine a time-domain restriction associated with the Doppler measurement is unconfigured; and
  measure the plurality of reference signals from the determined reference signal set and one or more additional reference signal sets based at least in part on the time-domain restriction being unconfigured.

10. The UE of claim 1, wherein the plurality of reference signals are tracking reference signals, channel state information reference signals, synchronization signal block transmissions, or a combination thereof.

11. The UE of claim 1, wherein the plurality of reference signals are within one or more downlink slots and the uplink resource comprises an uplink slot.

12. A method for wireless communications at a user equipment (UE), comprising:

determining an uplink resource for reporting a Doppler measurement to a network entity;

determining a reference signal set comprising a plurality of reference signals associated with the Doppler measurement, wherein a last reference signal of the plurality of reference signals of the reference signal set precedes a reference point associated with the uplink resource for reporting the Doppler measurement; and transmitting the Doppler measurement in the uplink resource based at least in part on the plurality of reference signals.

13. The method of claim 12, wherein determining the reference signal set comprises:

determining a second reference signal set comprising a second plurality of reference signals associated with the Doppler measurement, wherein a first subset of the second plurality of reference signals precedes the reference point, and wherein a second subset of the second plurality of reference signals is later in time than the reference point.

14. The method of claim 12, further comprising:

determining a channel state information reference resource based at least in part on a time resource for the uplink resource, wherein the reference point is an end time of the channel state information reference resource.

15. The method of claim 14, further comprising:

determining the channel state information reference resource based at least in part on a channel state information report being a Doppler measure report type.

16. The method of claim 12, further comprising:

determining an offset from the uplink resource based at least in part on a reporting configuration associated with the uplink resource, wherein the reference point is the offset from the uplink resource.

17. The method of claim 16, wherein the reporting configuration is associated with a fast channel state information reporting type.

18. The method of claim 16, wherein the reporting configuration is associated with a Doppler reporting type.

19. The method of claim 12, further comprising:

determining a time-domain restriction associated with the Doppler measurement is configured; and measuring the plurality of reference signals from the determined reference signal set based at least in part on the time-domain restriction being configured.

20. The method of claim 12, further comprising:

determining a time-domain restriction associated with the Doppler measurement is unconfigured; and measuring the plurality of reference signals from the determined reference signal set and one or more additional reference signal sets based at least in part on the time-domain restriction being unconfigured.

* * * * *